(12) United States Patent
Awada et al.

(10) Patent No.: US 12,477,613 B2
(45) Date of Patent: Nov. 18, 2025

(54) FILTERING OF LAYER 1 BEAM MEASUREMENTS FOR L1/2 INTER-CELL MOBILITY

(71) Applicant: Nokia Technologies Oy, Espoo (FI)

(72) Inventors: Ahmad Awada, Munich (DE); Panagiotis Spapis, Munich (DE); Umur Karabulut, Munich (DE); Sanjay Goyal, Denville, NJ (US)

(73) Assignee: Nokia Technologies Oy, Espoo (FI)

( * ) Notice: Subject to any disclaimer, the term of this patent is extended or adjusted under 35 U.S.C. 154(b) by 457 days.

(21) Appl. No.: 17/980,104

(22) Filed: Nov. 3, 2022

(65) Prior Publication Data

US 2024/0155723 A1 May 9, 2024

(51) Int. Cl.
*H04W 76/25* (2018.01)
*H04W 48/16* (2009.01)
*H04W 48/20* (2009.01)

(52) U.S. Cl.
CPC ........... *H04W 76/25* (2018.02); *H04W 48/16* (2013.01); *H04W 48/20* (2013.01)

(58) Field of Classification Search
CPC .......................... H04W 36/06; H04W 36/087; H04W 36/0055
See application file for complete search history.

(56) References Cited

U.S. PATENT DOCUMENTS 11,388,634 B2 * 7/2022 Rom ............... H04W 36/00835

FOREIGN PATENT DOCUMENTS

WO WO-2020155163 A1 8/2020

OTHER PUBLICATIONS

"Discussion on L1 enhancements for L1/L2-triggered mobility", Nokia, Nokia Shanghai Bell, 3GPP TSG RAN WG1 #111, R1-2211306, Nov. 2022, 20 pages.
"Prerequisites and benefits of Lower Layer Mobility", Nokia, Nokia Shanghai Bell, 3GPP TSG-RAN WG2 Meeting #119 Electronic, R2-2208212, Aug. 2022, 13 pages.
"Target enhancements and latency model for L1/2 triggered handover", InterDigital, Inc., 3GPP TSG RAN WG2 #119bis-e, R2-2210192, Oct. 2022, 5 pages.
"Measurements for L1/L2 mobility", InterDigital, Inc., 3GPP TSG RAN WG2 #119-bis-e, R2-2210451, Oct. 2022, 4 pages.

(Continued)

*Primary Examiner* — Diane D Mizrahi
(74) *Attorney, Agent, or Firm* — McCarter & English, LLP

(57) ABSTRACT

An apparatus may be configured to: receive two or more filtering configurations, wherein a first configuration is associated with at least one first target cell associated with a first distributed unit, wherein a second configuration is associated with at least one second target cell associated with at least one second distributed unit, wherein the first distributed unit is different from the at least one second distributed unit; select a configuration of the two or more configurations for at least one target cell based, at least partially, on a determination of whether a serving cell and the at least one target cell are controlled with a same distributed unit, wherein the serving cell is controlled with the first distributed unit; and perform filtering of a plurality of layer one measurements associated with the at least one target cell using the selected configuration.

20 Claims, 10 Drawing Sheets

(56) References Cited

OTHER PUBLICATIONS

3$^{rd}$ Generation Partnership Project; Technical Specification Group Radio Access Network; NR; Radio Resource Control (RRC) Protocol Specification (Release 17) 3GPP TS 38.331 V.17.2.0 (Sep. 2022).

3$^{rd}$ Generation Partnership Project; Technical Specification Group Radio Access Network; NR; NR and NG-RAN Overall Description; Stage 2 (Release 17) 3GPP TS 38.300 V17.2.0 (Sep. 2022).

3$^{rd}$ Generation Partnership Project; Technical Specification Group Radio Access Network; NR; Radio Resource Control (RRC) Protocol Specification (Release 16) 3GPP TS 38.331 V16.6.0 Section 5.5.3.2 pp. 143-144. (Sep. 2021).

3$^{rd}$ Generation Partnership Project; Technical Specification Group Radio Access Network; NR; Radio Resource Control (RRC) Protocol Specification (Release 16) 3GPP TS 38.331 V16.6.0 Section 6.3.2 pp. 354-678. (Sep. 2021).

\* cited by examiner

QuantityConfig information element

```
-- ASN1START
-- TAG-QUANTITYCONFIG-START

QuantityConfig ::=         SEQUENCE {
    quantityConfigNR-List         SEQUENCE (SIZE (1..maxNrofQuantityConfig)) OF QuantityConfigNR    OPTIONAL,    -- Need M
    ...,
    [[
    quantityConfigEUTRA           FilterConfig                                                      OPTIONAL     -- Need M
    ]],
    [[
    quantityConfigUTRA-FDD-r16    QuantityConfigUTRA-FDD-r16                                        OPTIONAL,    -- Need M
    quantityConfigCLI-r16         FilterConfigCLI-r16                                               OPTIONAL     -- Need M
    ]]
}

QuantityConfigNR::=        SEQUENCE {
    quantityConfigCell            QuantityConfigRS,
    quantityConfigRS-Index        QuantityConfigRS                                                  OPTIONAL     -- Need M
}

QuantityConfigRS ::=       SEQUENCE {
    ssb-FilterConfig              FilterConfig,
    csi-RS-FilterConfig           FilterConfig
}

FilterConfig ::=           SEQUENCE {
    filterCoefficientRSRP         FilterCoefficient                                                 DEFAULT fc4,
    filterCoefficientRSRQ         FilterCoefficient                                                 DEFAULT fc4,
    filterCoefficientRS-SINR      FilterCoefficient                                                 DEFAULT fc4
}
```

| | |
|---|---|
| receive two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit | 610 |

▼

| | |
|---|---|
| select a configuration of the two or more configurations for at least one target cell based, at least partially, on a determination of whether a serving cell and the at least one target cell are controlled with a same distributed unit, wherein the serving cell is controlled with the first distributed unit | 620 |

▼

| | |
|---|---|
| perform filtering of a plurality of layer one measurements associated with the at least one target cell using the selected configuration | 630 |

```
┌─────────────────────────────────────┐
│ transmit, to a user equipment, two or more │
│ filtering configurations, wherein a first │
│ configuration of the two or more filtering │
│ configurations is associated with at least one │
│ first target cell associated with a first │
│ distributed unit, wherein a second │
│ configuration of the two or more filtering │    710
│ configurations is associated with at least one │
│ second target cell associated with at least │
│ one second distributed unit, wherein the first │
│ distributed unit is different from the at least │
│ one second distributed unit │
└─────────────────────────────────────┘
                    ▼
┌─────────────────────────────────────┐
│ receive, from the user equipment, a radio │
│ resource control reconfiguration complete │
│ message in response to the two or more │    720
│ filtering configurations │
└─────────────────────────────────────┘
```

| | |
|---|---|
| receive two or more filtering configurations, wherein a first configuration of the two or more filtering configurations is associated with at least one first target cell associated with the apparatus, wherein a second configuration of the two or more filtering configurations is associated with at least one second target cell associated with at least one second distributed unit, wherein the at least one second distributed unit is different from the apparatus | 810 |
| select a configuration of the two or more configurations for at least one target cell based, at least partially, on a determination of whether a serving cell and the at least one target cell are controlled with a same distributed unit, wherein the serving cell is controlled with the apparatus | 820 |
| receive, from a user equipment, a layer one measurement report, wherein the layer one measurement report comprises a plurality of layer one measurements associated with the at least one target cell | 830 |
| perform filtering of the plurality of layer one measurements using the selected configuration | 840 |

910 — determine two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit 920 — transmit, to the first distributed unit, the two or more filtering configurations

FIG. 9

FILTERING OF LAYER 1 BEAM MEASUREMENTS FOR L1/2 INTER-CELL MOBILITY

TECHNICAL FIELD

The example and non-limiting embodiments relate generally to lower layer mobility (LLM) and, more particularly, filtering of L1 beam measurements.

BACKGROUND

It is known, in inter-cell mobility, to provide to a UE a configuration for reporting of L1 beam measurements.

SUMMARY

The following summary is merely intended to be illustrative. The summary is not intended to limit the scope of the claims.

In accordance with one aspect, an apparatus comprising: at least one processor; and at least one memory storing instructions that, when executed by the at least one processor, cause the apparatus at least to: receive two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit; select a configuration of the two or more configurations for at least one target cell based, at least partially, on a determination of whether a serving cell and the at least one target cell are controlled with a same distributed unit, wherein the serving cell is controlled with the first distributed unit; and perform filtering of a plurality of layer one measurements associated with the at least one target cell using the selected configuration.

In accordance with one aspect, a method comprising: receiving, with a user equipment, two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit; selecting a configuration of the two or more configurations for at least one target cell based, at least partially, on a determination of whether a serving cell and the at least one target cell are controlled with a same distributed unit, wherein the serving cell is controlled with the first distributed unit; and performing filtering of a plurality of layer one measurements associated with the at least one target cell using the selected configuration.

In accordance with one aspect, an apparatus comprising means for performing: receiving two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit; selecting a configuration of the two or more configurations for at least one target cell based, at least partially, on a determination of whether a serving cell and the at least one target cell are controlled with a same distributed unit, wherein the serving cell is controlled with the first distributed unit; and performing filtering of a plurality of layer one measurements associated with the at least one target cell using the selected configuration.

In accordance with one aspect, a non-transitory computer-readable medium comprising program instructions stored thereon for performing at least the following: causing receiving of two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit; selecting a configuration of the two or more configurations for at least one target cell based, at least partially, on a determination of whether a serving cell and the at least one target cell are controlled with a same distributed unit, wherein the serving cell is controlled with the first distributed unit; and performing filtering of a plurality of layer one measurements associated with the at least one target cell using the selected configuration.

In accordance with one aspect, an apparatus comprising: at least one processor; and at least one memory storing instructions that, when executed by the at least one processor, cause the apparatus at least to: transmit, to a user equipment, two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit; and receive, from the user equipment, a radio resource control reconfiguration complete message in response to the two or more filtering configurations.

In accordance with one aspect, a method comprising: transmitting, with a centralized unit to a user equipment, two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and receiving, from the user equipment, a radio resource control reconfiguration complete message in response to the two or more filtering configurations.

In accordance with one aspect, an apparatus comprising means for performing: transmitting, to a user equipment, two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit; and receiving, from the user equipment, a radio resource control reconfiguration complete message in response to the two or more filtering configurations.

In accordance with one aspect, a non-transitory computer-readable medium comprising program instructions stored thereon for performing at least the following: causing transmitting, to a user equipment, of two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit; and causing receiving, from the user equipment, of a radio resource control reconfiguration complete message in response to the two or more filtering configurations.

In accordance with one aspect, an apparatus comprising: at least one processor; and at least one memory storing instructions that, when executed by the at least one processor, cause the apparatus at least to: receive two or more filtering configurations, wherein a first configuration of the two or more filtering configurations is associated with at least one first target cell associated with the apparatus, wherein a second configuration of the two or more filtering configurations is associated with at least one second target cell associated with at least one second distributed unit, wherein the at least one second distributed unit is different from the apparatus; select a configuration of the two or more configurations for at least one target cell based, at least partially, on a determination of whether a serving cell and the at least one target cell are controlled with a same distributed unit, wherein the serving cell is controlled with the apparatus; receive, from a user equipment, a layer one measurement report, wherein the layer one measurement report comprises a plurality of layer one measurements associated with the at least one target cell; and perform filtering of the plurality of layer one measurements using the selected configuration.

In accordance with one aspect, a method comprising: receiving, with a distributed unit, two or more filtering configurations, wherein a first configuration of the two or more filtering configurations is associated with at least one first target cell associated with the distributed unit, wherein a second configuration of the two or more filtering configurations is associated with at least one second target cell associated with at least one second distributed unit, wherein the at least one second distributed unit is different from the distributed unit; selecting a configuration of the two or more configurations for at least one target cell based, at least partially, on a determination of whether a serving cell and the at least one target cell are controlled with a same distributed unit, wherein the serving cell is controlled with the distributed unit; receiving, from a user equipment, a layer one measurement report, wherein the layer one measurement report comprises a plurality of layer one measurements associated with the at least one target cell; and performing filtering of the plurality of layer one measurements using the selected configuration.

In accordance with one aspect, an apparatus comprising means for performing: receiving two or more filtering configurations, wherein a first configuration of the two or more filtering configurations is associated with at least one first target cell associated with the apparatus, wherein a second configuration of the two or more filtering configurations is associated with at least one second target cell associated with at least one second distributed unit, wherein the at least one second distributed unit is different from the apparatus; selecting a configuration of the two or more configurations for at least one target cell based, at least partially, on a determination of whether a serving cell and the at least one target cell are controlled with a same distributed unit, wherein the serving cell is controlled with the apparatus; receiving, from a user equipment, a layer one measurement report, wherein the layer one measurement report comprises a plurality of layer one measurements associated with the at least one target cell; and performing filtering of the plurality of layer one measurements using the selected configuration.

In accordance with one aspect, a non-transitory computer-readable medium comprising program instructions stored thereon for performing at least the following: causing receiving, with a distributed unit, of two or more filtering configurations, wherein a first configuration of the two or more filtering configurations is associated with at least one first target cell associated with the distributed unit, wherein a second configuration of the two or more filtering configurations is associated with at least one second target cell associated with at least one second distributed unit, wherein the at least one second distributed unit is different from the distributed unit; selecting a configuration of the two or more configurations for at least one target cell based, at least partially, on a determination of whether a serving cell and the at least one target cell are controlled with a same distributed unit, wherein the serving cell is controlled with the distributed unit; causing receiving, from a user equipment, of a layer one measurement report, wherein the layer one measurement report comprises a plurality of layer one measurements associated with the at least one target cell; and performing filtering of the plurality of layer one measurements using the selected configuration.

In accordance with one aspect, an apparatus comprising: at least one processor; and at least one memory storing instructions that, when executed by the at least one processor, cause the apparatus at least to: determine two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit; and transmit, to the first distributed unit, the two or more filtering configurations.

In accordance with one aspect, a method comprising: determining, with a centralized unit, two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit; and transmitting, to the first distributed unit, the two or more filtering configurations.

In accordance with one aspect, an apparatus comprising means for performing: determining two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit; and transmitting, to the first distributed unit, the two or more filtering configurations.

In accordance with one aspect, a non-transitory computer-readable medium comprising program instructions stored thereon for performing at least the following: determining two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit; and causing transmitting, to the first distributed unit, of the two or more filtering configurations.

In accordance with one aspect, an apparatus comprising: at least one processor; and at least one memory storing instructions that, when executed by the at least one processor, cause the apparatus at least to: cause transmission, to a user equipment, of at least one filtering configuration, wherein the user equipment is served via a serving cell of a first distributed unit; and transmit, to the first distributed unit, two or more filtering configurations, wherein a first configuration of the two or more filtering configurations is associated with at least one first target cell associated with the first distributed unit, wherein a second configuration of the two or more filtering configurations is associated with at least one second target cell associated with at least one second distributed unit, wherein the at least one second distributed unit is different from the first distributed unit.

In accordance with one aspect, a method comprising: causing transmission, with a centralized unit to a user equipment, of at least one filtering configuration, wherein the user equipment is served via a serving cell of a first distributed unit; and transmitting, to the first distributed unit, two or more filtering configurations, wherein a first configuration of the two or more filtering configurations is associated with at least one first target cell associated with the first distributed unit, wherein a second configuration of the two or more filtering configurations is associated with at least one second target cell associated with at least one second distributed unit, wherein the at least one second distributed unit is different from the first distributed unit.

In accordance with one aspect, an apparatus comprising means for performing: causing transmission, to a user equipment, of at least one filtering configuration, wherein the user equipment is served via a serving cell of a first distributed unit; and transmitting, to the first distributed unit, two or more filtering configurations, wherein a first configuration of the two or more filtering configurations is associated with at least one first target cell associated with the first distributed unit, wherein a second configuration of the two or more filtering configurations is associated with at least one second target cell associated with at least one second distributed unit, wherein the at least one second distributed unit is different from the first distributed unit.

In accordance with one aspect, a non-transitory computer-readable medium comprising program instructions stored thereon for performing at least the following: causing transmission, to a user equipment, of at least one filtering configuration, wherein the user equipment is served via a serving cell of a first distributed unit; and causing transmitting, to the first distributed unit, of two or more filtering configurations, wherein a first configuration of the two or more filtering configurations is associated with at least one first target cell associated with the first distributed unit, wherein a second configuration of the two or more filtering configurations is associated with at least one second target cell associated with at least one second distributed unit, wherein the at least one second distributed unit is different from the first distributed unit.

According to some aspects, there is provided the subject matter of the independent claims. Some further aspects are defined in the dependent claims.

BRIEF DESCRIPTION OF THE DRAWINGS

The foregoing aspects and other features are explained in the following description, taken in connection with the accompanying drawings, wherein:

FIG. 3 is a diagram illustrating features as described herein;

FIG. 6 is a flowchart illustrating steps as described herein;

FIG. 7 is a flowchart illustrating steps as described herein;

FIG. 8 is a flowchart illustrating steps as described herein;

FIG. 9 is a flowchart illustrating steps as described herein; and

DETAILED DESCRIPTION OF EMBODIMENTS

Figure 1:
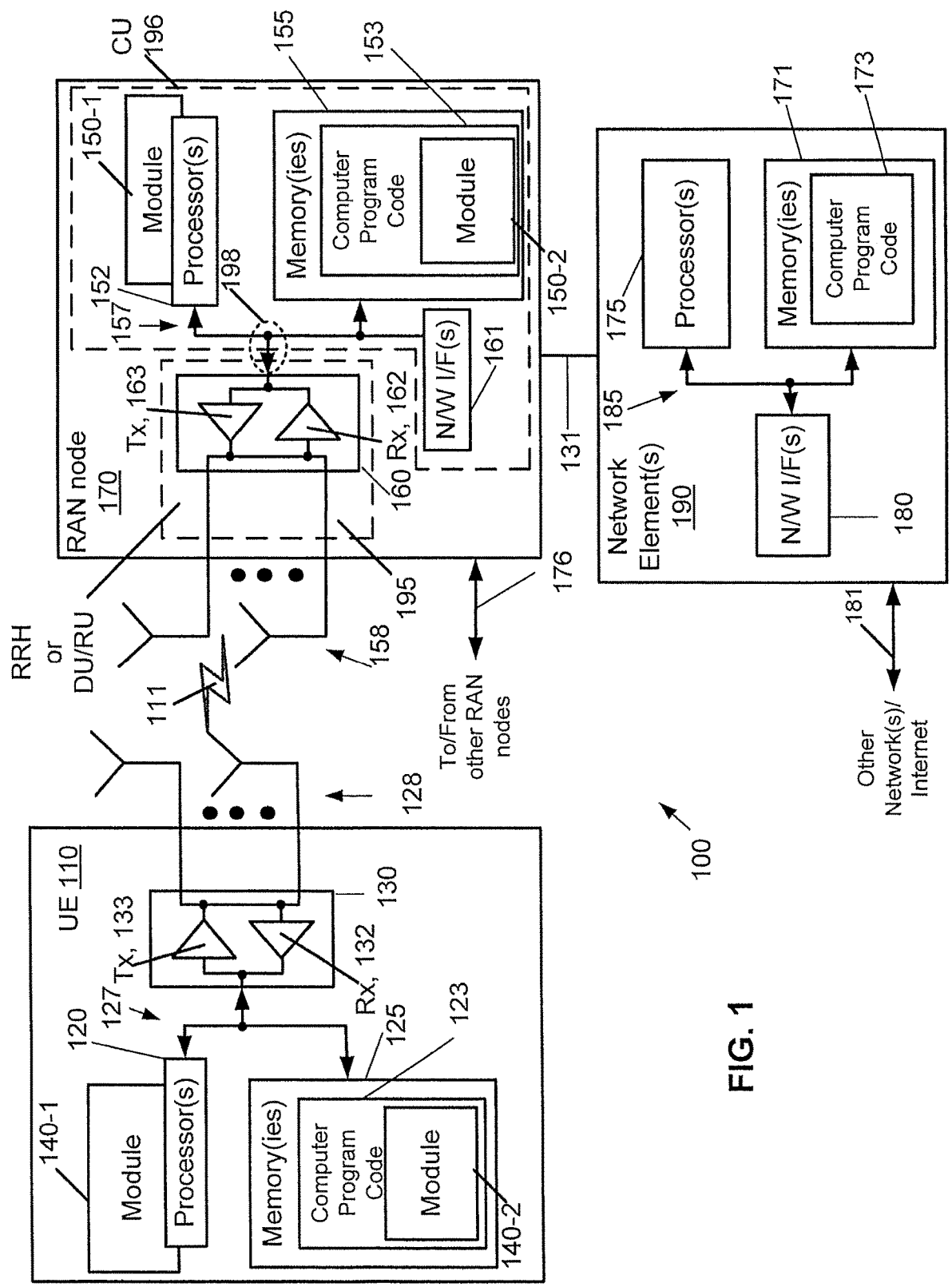
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
AMF access and mobility management function
CE control element
CLI cross link interference
cRAN cloud radio access network
CSI-RS channel state information reference signal
CU central/centralized unit
DRX discontinuous reception
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDD frequency division duplex
gNB (or gNodeB) base station for 5G/NR, i.e., a node providing NR user plane and control plane protocol terminations towards the UE, and connected via the NG interface to the 5GC
I/F interface
L1 layer 1
L3 layer 3
LLM lower layer mobility
LTE long term evolution
MAC medium access control
MME mobility management entity
ng or NG new generation
ng-eNB or NG-eNB new generation eNB
NR new radio
N/W or NW network OAM operations, administration and maintenance
O-RAN open radio access network
PDCCH physical downlink control channel
PDCP packet data convergence protocol
PHY physical layer
QCL quasi co-location
RACH random access channel
RAN radio access network
RF radio frequency
RLC radio link control
RRC radio resource control
RRH remote radio head
RS reference signal
RSRP reference signal received power
RSRQ reference signal received quality
RU radio unit
Rx receiver
SDAP service data adaptation protocol
SDU service data unit
SGW serving gateway
SINR signal to interference and noise ratio
SMF session management function
SSB synchronization signal block
TTT time to trigger
Tx transmitter
UE user equipment (e.g., a wireless, typically mobile device)
UPF user plane function
UTRA universal terrestrial radio access
VNR virtualized network function Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. A "circuit" may include dedicated hardware or hardware in association with software executable thereon. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station, access point, access node, or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may be implemented, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. For example, a network may be deployed in a tele cloud, with virtualized network functions (VNF) running on, for example, data center servers. For example, network core functions and/or radio access network(s) (e.g. CloudRAN, O-RAN, edge cloud) may be virtualized. Note that the virtualized entities that result from the network virtualization are still implemented, at some level, using hardware such as processors 152 or 175 and memories 155 and 171, and also such virtualized entities create technical effects.

It may also be noted that operations of example embodiments of the present disclosure may be carried out by a plurality of cooperating devices (e.g. cRAN).

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the example embodiments of the present disclosure, example embodiments will now be described with greater specificity.

In the present disclosure, the terms prepared target cell, prepared candidate target cell, prepared cell, candidate cell, candidate target cell, and target cell are used interchangeably. In the present disclosure, the terms L1/2 inter-Cell mobility, lower layer mobility, and L1/2 handover are used interchangeably.

Figure 2:
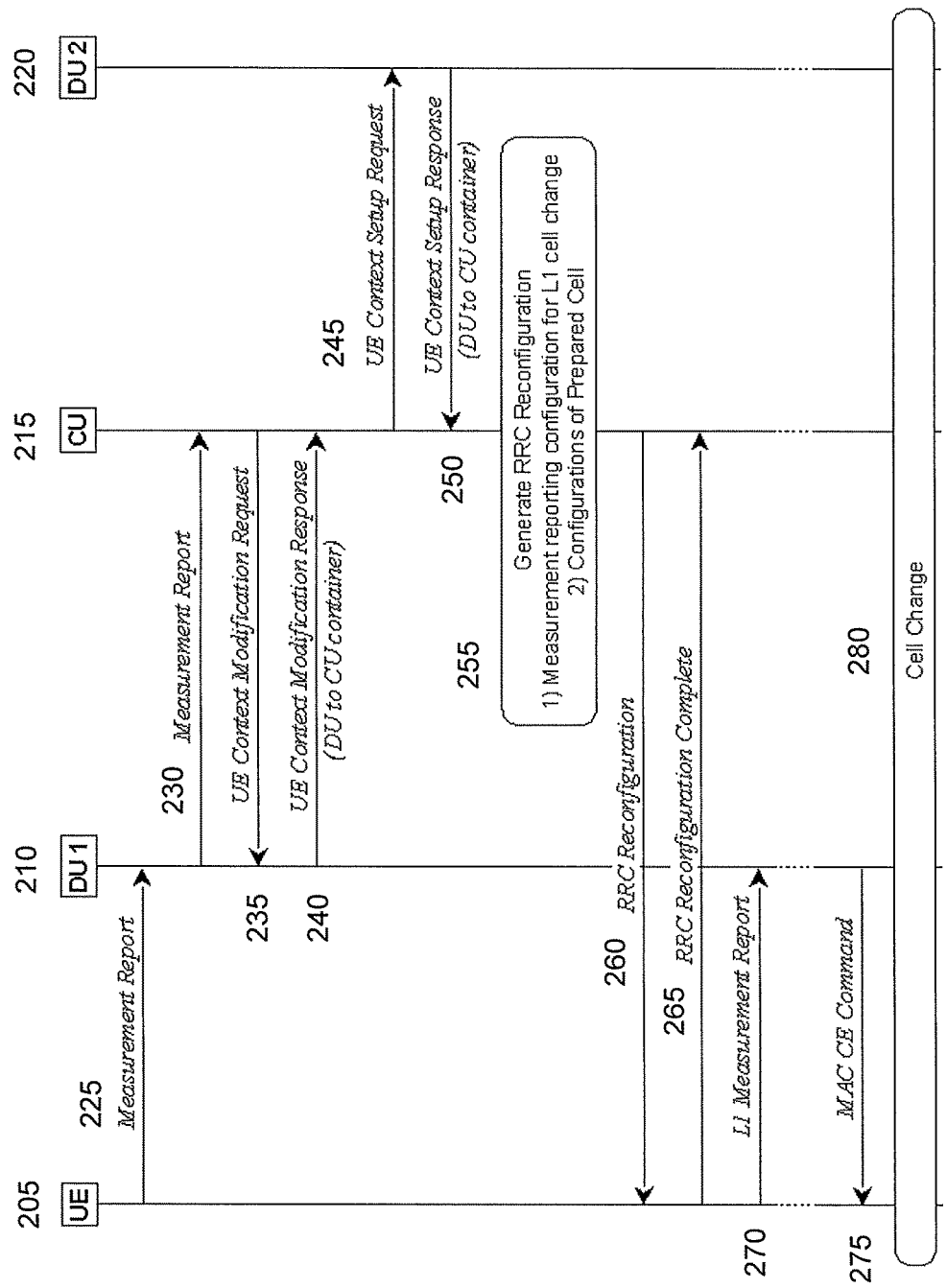
FIG. 2 is a flowchart illustrating steps as described herein.

Features as described herein may relate to L1/2 inter-cell mobility, or lower layer mobility (LLM). L1/2 inter-cell mobility is one of the objectives for mobility enhancement in Rel. 18. In contrast to L3 mobility procedures, where the handover between two cells is decided by RRC layer, L1/2 inter-cell mobility is performed by the MAC layer terminated in the Distributed Unit (DU). Referring now to FIG. 2, illustrated is an exemplary implementation for the signaling diagram of L1/2 inter-cell mobility from a serving cell in DU1 (210) to a target cell in DU2 (220) (i.e. inter-DU intra-CU scenario). The same diagram may apply as well in case of intra-DU intra-CU cell change, where DU 1 (210) would be the same as DU2 (i.e., DU2 (220) would be replaced in FIG. 2 by DU1 (210)).

At 225, the UE (205) may send a measurement report containing the cell quality measurements of serving and neighboring cells. The UE (205) may be configured by the serving cell to send measurement report early, when it still has a good connection to the serving cell. At 230, the DU1 (210) may forward the measurement report to the CU (215). Using the reported cell quality measurements, the CU (215) may identify a potential set of candidate target cells to which the UE (205) may be handed over to. In this example, the CU (215) may identify candidate target cells that are served by DU1 (210) (e.g. controlling the serving DU/cell as well) and another DU2 (220) that is controlled by the same CU (215).

At 235, the CU (215) may request preparation of a candidate target cell controlled by DU1 (210) by sending a UE Context Modification Request message. At 240, DU1 (210) may provide the configuration of the UE (205) in UE Context Modification Response message containing a container from DU to CU.

At 245, the CU (215) may transmit, to DU2 (220), a UE Context Setup Request. At 250, the DU2 (220) may transmit, to the CU (215) a UE Context Setup Response message, which may contain a DU to CU container. The DU2 (220) may prepare target cell(s) that are controlled by DU2 (220).

At 255, having received the UE configurations for the candidate target cell(s), the CU (215) may generate an RRC Reconfiguration message configured to be sent to the UE (205). Among other information, the RRC Reconfiguration message may contain: a measurement reporting configuration for L1/2 handover, (i.e. a configuration on how to report the L1 beam measurements of serving and target cells, e.g. at 270); and/or a configuration of the prepared candidate cell(s), which the UE (205) may need to execute when it receives a MAC CE command to change the serving cell (perform handover), for example as shown at 275. At 260, the CU (215) may transmit the generated RRC Reconfiguration message to the UE (205).

After confirming the RRC Reconfiguration to the network at 265, the UE (205) may start to report periodically the L1 beam measurement of serving and candidate target cells, at 270. Upon determining that there is a target candidate cell having a better radio link/beam measurement than the serving cell, e.g., L1-RSRP of target beam measurement>L1-RSRP of serving beam measurement+Offset for an amount of time e.g., Time-to-Trigger (TTT), the serving cell (210) may send a MAC Control Element (MAC CE) or a L1 message, at 275, to trigger the cell change to the target candidate cell (e.g. 220). At 280, the handover from the serving cell (210) to the target cell (220) may be executed by the UE.

Features as described herein may relate to L3 filtering for cell quality and beam measurements. The measurement report at 225 in FIG. 2 may contains the cell quality measurements and, optionally, L3 beam measurements. The cell quality measurement may be computed by applying L3 filtering [TS 38.331, section 5.5.3.2] to L1 cell quality measurement, which may be obtained by performing beam consolidation/selection [TS 38.300, Section 9.2.4, point B], i.e., averaging over the N strongest L1 beam measurements above threshold T. 3GPP TS 38.300, Section 9.2.4 states:

" . . . In RRC_CONNECTED, the UE measures multiple beams (at least one) of a cell and the measurements results (power values) are averaged to derive the cell quality. In doing so, the UE is configured to consider a subset of the detected beams. Filtering takes place at two different levels: at the physical layer to derive beam quality and then at RRC level to derive cell quality from multiple beams. Cell quality from beam measurements is derived in the same way for the serving cell(s) and for the non-serving cell(s). Measurement reports may contain the measurement results of the X best beams if the UE is configured to do so by the gNB . . . "

In a high-level measurement model, measurements of specific gNB beam samples may be provided to physical L1 filtering. The execution of the measurements in the physical layer may not be defined in the standard. The L1 filtering may be UE implementation specific. Beam specific measurements may be reported by the L1 filtering to a beam consolidation/selection module/function, as well as to L3 beam filtering.

The beam consolidation/selection module/function may be standardized, and configured by RRC signaling, and may consolidate measurements to determine the quality of the cell. The cell quality may be reported to L3 filtering for cell quality, which may be standardized, and configured by RRC signaling. The result of filtering may be reported for a measurement period for evaluation of reporting criteria, which may be standardized, and configured by RRC signaling. The evaluation of reporting criteria may be standardized, and configured by RRC signaling. Evaluation may occur whether a new measurement result is received. The result of the evaluation, e.g. a measurement report information/message, may be transmitted on a radio interface.

The L3 beam filtering may be performed on the beam specific measurements output by L1 filtering. The L3 beam filtering may be standardized, and configured by RRC signaling. The output of the L3 beam filtering may be a beam specific measurement, and may be reported for a reporting period equal to a measurement period of the input. The output of the L3 beam filtering may be input to a module/function for beam selection for reporting. The module/function for beam selection for reporting may select one or more beam measurements to be provided, for example in a measurement report transmitted on the radio interface. The module/function for beam selection for reporting may be standardized, and configured by RRC signaling.

With respect to L3 filtering for cell quality, the following requirements for a UE are stated in 3GPP TS 38.331, 5.5.3.2:

UE shall:
1> for each cell measurement quantity, each beam measurement quantity, each sidelink measurement quantity as needed in sub-clause 5.8.10, and for each CLI measurement quantity that the UE performs measurements according to 5.5.3.1:
2> filter the measured result, before using for evaluation of reporting criteria or for measurement reporting, by the following formula:

$$F_n = (1-a)*F_{n-1} + a*M_n$$

where $M_n$ is the latest received measurement result from the physical layer;
$F_n$ is the updated filtered measurement result, that is used for evaluation of reporting criteria or for measurement reporting;
$F_{n-1}$ is the old filtered measurement result, where F0 is set to M1 when the first measurement result from the physical layer is received; and for MeasObjectNR, a=1/2(ki/4), where ki is the filterCoefficient for the corresponding measurement quantity of the i:th QuantityConfigNR in quantityConfigNR-List, and i is indicated by quantityConfigIndex in MeasObjectNR; for other measurements, a=1/2(k/4), where k is the filterCoefficient for the corresponding measurement quantity received by the quantityConfig;
for UTRA-FDD, a=1/2(k/4), where k is the filterCoefficient for the corresponding measurement quantity received by quantityConfigUTRA-FDD in the QuantityConfig;

2> adapt the filter such that the time characteristics of the filter are preserved at different input rates, observing that the filterCoefficient k assumes a sample rate equal to X ms; The value of X is equivalent to one intrafrequency L1 measurement period as defined in TS 38.133 assuming non-DRX operation, and depends on frequency range . . . "

The measurement configuration provided by the network to the UE may contain the measurement object, which may include the configuration of the filter coefficient used for deriving the L3 cell quality and beam measurements (see QuantityConfigNR [TS 38.331]). Referring now to FIG. 3, illustrated is an example of a QuantityConfig information element. The QuantityConfigNR (310) may be included in the QuantityConfig information element. Different filtering coefficients may be configured for reference signal received power (RSRP), reference signal received quality (RSRQ), and reference signal (RS) signal to interference and noise ratio (RS-SINR), and for RS types, for example synchronization signal block (SSB) and channel state information reference signal (CSI-RS).

Example embodiments of the present disclosure may relate to filtering of L1 beam specific measurements that are reported to MAC layer of a serving DU as part of L1/2 inter-cell mobility.

Referring now to FIG. 2, the DU (210) may decide that LLM is appropriate for the UE (205) based, at least partially, on L1 beam measurements that are reported by the UE (205) to the network (270). Given that L1 beam measurements follow more the channel variations than L3 measurements (i.e., L3 filtering introduces delay to L3 measurements), the network (e.g. 210) may react faster to serving cell signal strength degradations by handing over the UE (205) to another cell (e.g. 220). This may ensure that the UE (205) is served with the best radio link. However, this comes at the expense of an increase in the number of ping-pongs between cells (i.e. forth and back handovers due to fast reaction to temporal changes in the L1 measurements), which may have one or more of the following drawbacks in intra-CU inter-DU scenario.

A drawback in the intra-CU inter-DU scenario may be increased signaling overhead, given that the target cell is controlled by a DU that is different from the one serving the UE. For instance, the source DU (210) may need to communicate with the target DU (220) (via the CU (215)) before/upon cell switch (280). For example, the target DU (210) may need to know the RS which shall be used as the quasi co-location (QCL) source for sending physical downlink control channel (PDCCH) to the UE in case of RACH-less handover, and the path may need to be switched from the source cell to the new target cell, etc.

A drawback in case of inter-DU LLM may be that the RLC/MAC may need to be re-established/reset and PDCP recovery shall be enabled to re-transmit the PDCP SDUs that have not been acknowledged by the UE. As such, high number of inter-DU ping-pongs would increase the latency in re-transmitting the pending packets. This is not necessary the case for intra-DU where the same RLC/MAC may be controlled by the same DU.

Based on these potential drawbacks, an additional filtering for the L1 beam measurements of the UEs may be applied to reduce the number of ping-pongs. The cost of ping-pong may be higher for the inter-DU case than the intra-DU case in terms of signaling overhead and latency in re-transmitting the pending packets. A technical effect of example embodiments of the present disclosure may be to clarify how to apply the additional filtering for L1 beam measurements. A technical effect of example embodiments of the present disclosure may be to achieve the best LLM performance in intra- and inter-DU cases.

In an example embodiment, the UE may be made aware, by the network, of whether the prepared candidate target cell belongs to the same DU as the source cell, or to a different DU. Example embodiments of the present disclosure might not relate to enhancements to filtering of L1 beam measurements used for LLM.

In an example embodiment, different filtering configurations for L1 beam measurements may be applied for different groups of prepared target cells. In an example embodiment, different filtering configurations may be applied for prepared target cells that are controlled by same DU and different DU. For example, a first filtering configuration may be applied for group #1: intra-DU prepared target cells (i.e., prepared target cells controlled by the same DU as of the UE's serving cell), while a second filtering configuration may be applied for group #2: inter-DU prepared target cells (i.e., prepared target cells controlled by a DU different from the DU of the UE's serving cell).

In an example embodiment, a filtering configuration (e.g., third filtering configuration) may be applied for a specific prepared target cell which may belong to the same DU as of the UE's serving cell, or to a different DU (i.e. the group may contain one specific prepared target cell). There may be one or more such specific prepared target cells; each may be configured with a separate filtering configuration.

Three main alternative example embodiments are described in the present disclosure. In the first alternative, the filtering may be performed by the UE. In the second alternative, the filtering may be performed by the network (e.g., serving cell triggering LLM). In the third alternative, filtering may be performed by both the UE and by the network.

In an example embodiment according to the first alternative, the UE may apply the additional filtering to L1 beam measurements before reporting them to the network (e.g., serving cell). In an example embodiment, the UE may be configured by the network with different filtering configuration parameters that apply for different groups of cells (i.e. prepared target cells that are controlled by same DU or different DU). In an example embodiment, the UE may select and apply the filtering configuration with respect to a prepared target cell depending on whether the serving cell and target cell are controlled by the same or different DUs. For example, the UE may select a first filtering configuration for application to L1 beam measurements for a first prepared target cell, a second filtering configuration to L1 beam measurements for a second, different prepared target cell, etc. In an example embodiment, the filtering configuration parameters for multiple groups of cells may be received via an RRC Reconfiguration message from the network.

In an example embodiment according to the second alternative, the network (e.g., serving cell) may apply the additional filtering to L1 beam measurements received from the UE. In an example embodiment, the serving cell (DU) may apply different filtering configuration parameters for different groups of cells, (i.e. target cells that are controlled by same DU or different DU). That is, the serving cell may select and apply the filtering configuration with respect to a prepared target cell depending on whether the serving cell and target cell are controlled by the same or different DUs. In an example embodiment, the filtering configuration with respect to the target cell may be received by the DU from the CU or from operations, administration, and maintenance (OAM) function.

In an example embodiment according to the third alternative, joint/hybrid filtering may be performed, where both the UE and the network (e.g., serving cell) may apply filtering. For example, the UE may first apply the filtering to L1 beam measurements for each configured cell and report the results to the network, and then the network may apply additional filtering to the received results from the UE. For example, the UE may apply filtering to L1 beam measurements for each configured cell to generate first filtered average measurement results, and report to the network, and then the network may apply additional filtering to filtered L1 beam measurements received from the UE (i.e. L1 beam measurements that have already been filtered by the UE) using time domain averaging (e.g., moving average using a filter coefficient) to obtain the final filtered measurement results. The filtering configurations applied by the UE and the DU may be at least partially different.

In an example embodiment according to the third alternative, the UE may receive filtering configurations from the CU via an RRC reconfiguration message. In an example embodiment, the filtering configuration applied by the UE may be decided by the CU or by the serving DU. If the filtering configuration applied by the UE is selected by the serving DU, the serving DU may indicate the selection to the CU, which may communicate the selection to the UE via an RRC reconfiguration message.

In an example embodiment according to the third alternative, the UE may be configured by the network with filtering configuration parameters to generate the filtered measurement results for one or more prepared target cells. Different filtering configurations may be given for different groups of cells (i.e. prepared target cells that are controlled by same DU or different DU). In another example embodiment, the same filtering configuration(s) may be given for all types of cells. In other words, the UE may only receive a single filtering configuration and apply that single filtering configuration. The DU may optionally apply an additional filtering, differentiating between the different groups of cells.

In an example embodiment according to the third alternative, the UE may select and apply the filtering configuration with respect to a prepared target cell depending on whether the serving cell and the target cell are controlled by the same or different DUs, and generate the filtered measurement result for each of the configured cell. In case of the same filtering configuration, the UE may apply the same filtering to the measurement results for any prepared target cell, irrespective of whether the cell belongs to the same of different DU of the UE's serving cell. In an example embodiment, the serving cell may apply the additional filtering to the received filtered measurement result for a prepared target cell from the UE. Different filtering configurations may be applied with respect to a prepared target cell depending on whether the serving cell and target cell are controlled by the same or different DUs.

In an example embodiment according to the first, second, or third alternative, the filtering configuration parameters may consist of at least one of the following parameters: parameters to perform time domain averaging, e.g., filter coefficient (e.g., k); forgetting factor ($a=1/2(k/4)$); and/or the number of L1 measurement that shall be averaged within a time window, etc. In an example embodiment, the filtering configuration parameters may be different for different measurement quantities (L1-RSRP, or L1-SINR) and/or Reference Signal (RS) types: SSB or CSI-RS. In an example embodiment, different filter configurations may be used for the same cell, simultaneously (i.e., the serving cell measurements may be filtered by using two different filter configurations that may be defined for two different groups). This may be needed to ensure that the UE or the network compares the measurements of the serving cell against the measurements of the target cell using the same filtering configuration. For example, assume that there are four prepared target cells 1, 2, 3, and 4, which may be split into two groups: group 1={1,2} and group 2={3,4}. The cells of group 1 may be controlled by the same DU of the serving cell, and the cells of group 2 may be controlled by a different DU. In this case, the UE may filter the serving cell measurements and the measurements of target cells 1, 2 using filtering configuration #1, and the UE may filter the serving cell measurements and the measurements of target cells 3, 4 using filtering configuration #2. The serving cell and the target cell may need to be filtered by the same configuration, since the network may need to compare them against each other, otherwise, the comparison may not be fair/proper/biased/etc.

Figure 4:
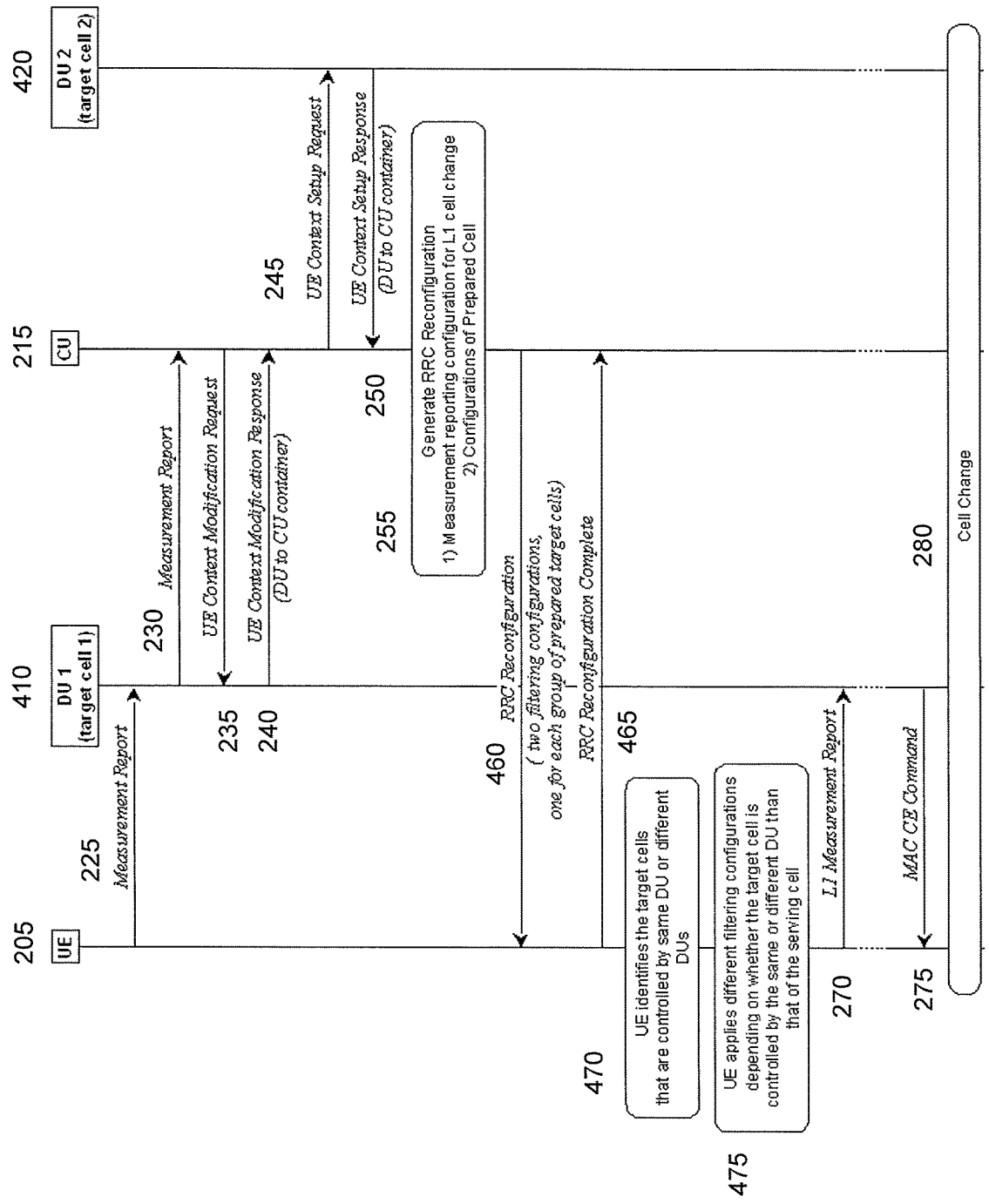
FIG. 4 is a flowchart illustrating steps as described herein.

Referring now to FIG. 4, illustrated is a signaling diagram for L1/2 inter-cell mobility according to the first alternative. Parts of FIG. 4 are similar to parts of FIG. 2, and accordingly are labeled in the same manner; overlapping description is not included.

At 460, the UE (205) may receive from the CU (215) at least two different filter configurations, #1 and #2, which may be applied for intra-DU and inter-DU LLM, respectively. That is, if the serving cell is controlled by the same DU (410) as that of target cell 1, the UE may apply configuration #1 for target cell 1. Similarly, if the target cell is controlled by a different DU than that of the serving cell, the UE may apply configuration #2 for target cell 2. At 465, the UE (205) may transmit, to the CU (215) an RRC Reconfiguration Complete message.

At 470, the UE (205) may identify that the target cells are controlled by either the same DU or different DUs. In FIG. 4, DU1 (410) is illustrated to control target cell 1, while DU2 (420) is illustrated to control target cell 2. However, the scenario illustrated in FIG. 4 is not limiting; DU1 (410) and DU2 (420) may control a same target cell 1. At 475, the UE (205) may apply different filtering configurations depending on whether the target cell is controlled by the same or different DU than that of the serving cell. In the example of FIG. 4, based on the determination that the target cell (420) is controlled by a different DU than that of the serving cell (410), the UE (205) may apply configuration #2.

For fair comparison between the filtered serving and target cell measurements (i.e. to decide if the filtered target cell measurement is greater than the source cell measurement where the measurements have been processed using the same filter parameters), the UE may apply both filter configurations to the serving cell measurements before sending the measurement report to the network or evaluating any further condition that is related to measurement reporting or handover.

In an example embodiment, the UE (205) may send to the CU (215) a UE capability indication indicating whether the UE (205) can support the handling of two different filter configurations, depending on whether the target cell is controlled by the same or different DU. While this is not illustrated in FIG. 4, it may be included as part of the measurement report (225), or may be transmitted to the CU (215) before the CU (215) transmits, to the UE (205), the RRC Reconfiguration (460). In an example embodiment, the UE (205) may receive an RRC Reconfiguration message (460) including two or more filtering configurations only if both the UE (205) and the serving DU (410) support multiple filtering configurations, for example according to an example embodiment of the present disclosure.

In another example embodiment, the two filter configurations (460) may be provided by the serving DU (410) as part of the UE context modification response (240), which may in turn be sent to the UE (205) at 460 via the CU (215) generating the RRC Reconfiguration message (i.e. including the provided filter configurations).

Figure 5:
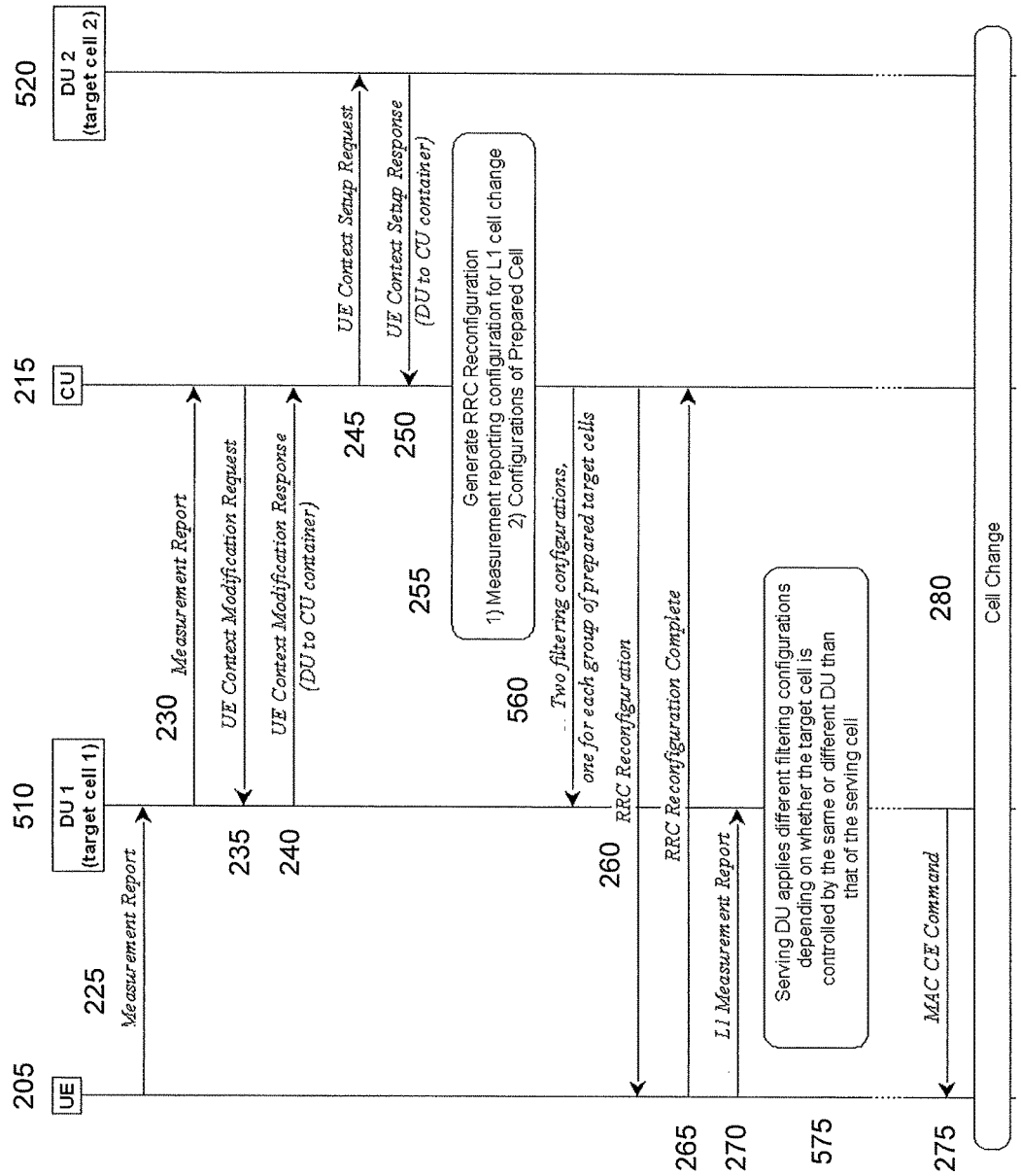
FIG. 5 is a flowchart illustrating steps as described herein.

Referring now to FIG. 5, illustrated is a signaling diagram for L1/2 inter-cell mobility according to the second alternative. Parts of FIG. 5 are similar to parts of FIG. 2, and accordingly are labeled in the same manner; overlapping description is not included.

At 560, the serving DU (510) may receive at least two different filter configurations, #1 and #2, which may be applied for intra-DU and inter-DU LLM, respectively. That is, if the serving cell is controlled by the same DU as that of target cell 1, the serving DU may apply configuration #1 for target cell 1. Similarly, if the target cell is controlled by a different DU than that of the serving cell, the serving DU may apply configuration #2 for target cell 2.

In FIG. 5, DU1 (510) is illustrated to control target cell 1, while DU2 (520) is illustrated to control target cell 2. However, the scenario illustrated in FIG. 5 is not limiting; DU1 (510) and DU2 (520) may control a same target cell 1. At 575, the UE (205) may transmit, to DU1 (510), an L1 measurement report.

At 575, the serving DU (510) may apply different filtering configurations depending on whether the target cell is controlled by the same or a different DU than that of the serving cell. For example, the serving DU (510) may determine whether the target cell is controlled by the same or a different DU than that of the serving cell.

For fair comparison between the filtered serving and target cell measurements (i.e. to decide if the filtered target cell measurement is greater than the source cell measurement where the measurements have been processed using the same filter parameters), the serving DU may apply both filter configurations on the serving cell measurements (i.e. to the same measurement, quantity that is received from the UE (205)).

In an example embodiment, the filtering configurations (560) may be provided to the serving DU (510) during the setup of the F1 interface between the CU (215) and the DU (510) (i.e. in an F1 Setup Request message from the CU to the DU).

In an example embodiment, the DU (510) may indicate to the CU (215) if it cannot support the handling of two different filter configurations depending on whether the target cell is controlled by the same or different DU. That is, if the DU cannot support the handling of two different filter configurations that are sent by the CU (215) to the DU (510), for example at 560, the DU (510) may inform the CU (215) about this. In an example embodiment, an operator may ensure that the CU (215) and DU (510) match from a capabilities perspective.

The third alternative may be performed according to a combination of FIGS. 4 and 5, where L1 beam measurements may be first filtered by the UE based on the given filtering configuration, and then filtered additionally by the network (i.e., serving cell). A person of ordinary skill in the art will understand that one, some, or all of the steps of FIG. 4 may occur in combination with the steps illustrated in FIG. 5, and that these steps may or may not be performed concurrently with each other.

A technical effect of example embodiments of the present disclosure may be to enable a more reliable inter-DU LLM handover as compared to other options in which the cost of ping-pong is more costly than intra-DU LLM. A technical effect of example embodiments of the present disclosure may be to quickly trigger the handover in intra-DU case where ping-pong is not that critical.

FIG. 6 illustrates the potential steps of an example method 600. The example method 600 may include: receiving two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit, 610; selecting a configuration of the two or more configurations for at least one target cell based, at least partially, on a determination of whether a serving cell and the at least one target cell are controlled with a same distributed unit, wherein the serving cell is controlled with the first distributed unit, 620; and performing filtering of a plurality of layer one measurements associated with the at least one target cell using the selected configuration, 630. The example method 600 may be according to the first alternative. The example method 600 may be performed, for example, with a UE.

FIG. 7 illustrates the potential steps of an example method 700. The example method 700 may include: transmitting, to a user equipment, two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit, 710; and receiving, from the user equipment, a radio resource control reconfiguration complete message in response to the two or more filtering configurations, 720. The example method 700 may be according to the first alternative. The example method 700 may be performed, for example, with a CU.

FIG. 8 illustrates the potential steps of an example method 800. The example method 800 may include: receiving two or more filtering configurations, wherein a first configuration of the two or more filtering configurations is associated with at least one first target cell associated with the apparatus, wherein a second configuration of the two or more filtering configurations is associated with at least one second target cell associated with at least one second distributed unit, wherein the at least one second distributed unit is different from the apparatus, 810; selecting a configuration of the two or more configurations for at least one target cell based, at least partially, on a determination of whether a serving cell and the at least one target cell are controlled with a same distributed unit, wherein the serving cell is controlled with the apparatus, 820; receiving, from a user equipment, a layer one measurement report, wherein the layer one measurement report comprises a plurality of layer one measurements associated with the at least one target cell, 830; and performing filtering of the plurality of layer one measurements using the selected configuration, 840. The example method

800 may be according to alternative 2. The example method 800 may be performed, for example, with a DU.

FIG. 9 illustrates the potential steps of an example method 900. The example method 900 may include: determining two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit, 910; and transmitting, to the first distributed unit, the two or more filtering configurations, 920. The example method 900 may be according to alternative 2. The example method 900 may be performed, for example, with a CU.

Figure 10:
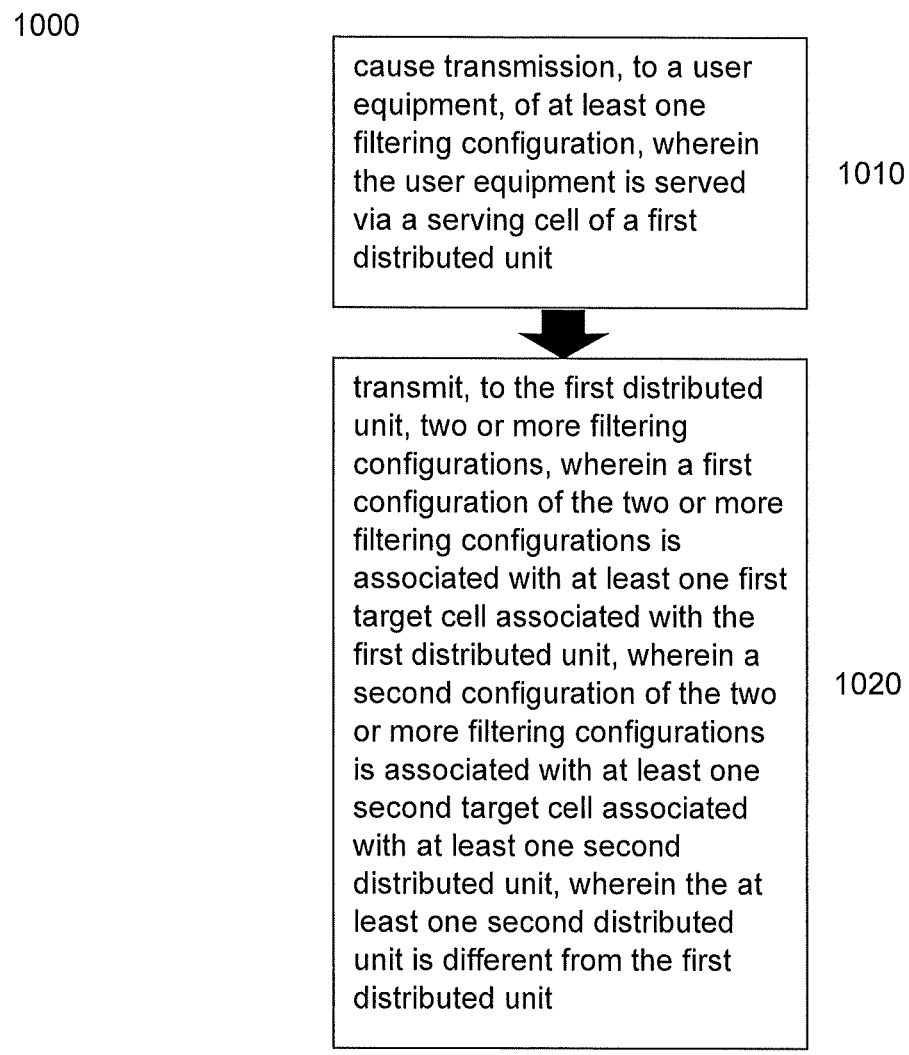
FIG. 10 is a flowchart illustrating steps as described herein.

FIG. 10 illustrates the potential steps of an example method 1000. The example method 1000 may include: causing transmission, to a user equipment, of at least one filtering configuration, wherein the user equipment is served via a serving cell of a first distributed unit, 1010; and transmitting, to the first distributed unit, two or more filtering configurations, wherein a first configuration of the two or more filtering configurations is associated with at least one first target cell associated with the first distributed unit, wherein a second configuration of the two or more filtering configurations is associated with at least one second target cell associated with at least one second distributed unit, wherein the at least one second distributed unit is different from the first distributed unit, 1020. The example method 1000 may be according to alternative 3. The example method 1000 may be performed, for example, with a CU.

In accordance with one example embodiment, an apparatus may comprise: at least one processor; and at least one memory storing instructions that, when executed by the at least one processor, cause the apparatus at least to: receive two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; select a configuration of the two or more configurations for at least one target cell based, at least partially, on a determination of whether a serving cell and the at least one target cell are controlled with a same distributed unit, wherein the serving cell may be controlled with the first distributed unit; and perform filtering of a plurality of layer one measurements associated with the at least one target cell using the selected configuration.

The two or more filtering configurations may be received via a radio resource control reconfiguration message from a centralized unit.

The two or more filtering configurations may comprise at least one filtering configuration selected by the first distributed unit.

The two or more filtering configurations may respectively comprise at least one filtering configuration parameter, wherein the at least one filtering configuration parameter may comprise at least one of: a parameter for performing time domain averaging, a filter coefficient for performing time domain averaging, a forgetting factor for performing time domain averaging, a number of layer one measurements to be averaged in a time window, a parameter for a layer one reference signal received power measurement, a parameter for a layer one signal to interference plus noise ratio measurement, a parameter for a synchronization signal block measurement, or a parameter for a channel state information reference signal measurement.

Selecting the configuration may comprise the example apparatus being configured to: select a plurality of configurations for the serving cell.

The example apparatus may be further configured to: transmit, to the first distributed unit, a layer one measurement report, wherein the layer one measurement report may comprise, at least, a result of the filtering of the plurality of layer one measurements.

The example apparatus may be further configured to: transmit, to a centralized unit, an indication of whether the apparatus supports the two or more filtering configurations.

In accordance with one aspect, an example method may be provided comprising: receiving, with a user equipment, two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; selecting a configuration of the two or more configurations for at least one target cell based, at least partially, on a determination of whether a serving cell and the at least one target cell are controlled with a same distributed unit, wherein the serving cell may be controlled with the first distributed unit; and performing filtering of a plurality of layer one measurements associated with the at least one target cell using the selected configuration.

The two or more filtering configurations may be received via a radio resource control reconfiguration message from a centralized unit.

The two or more filtering configurations may comprise at least one filtering configuration selected by the first distributed unit.

The two or more filtering configurations may respectively comprise at least one filtering configuration parameter, wherein the at least one filtering configuration parameter may comprise at least one of: a parameter for performing time domain averaging, a filter coefficient for performing time domain averaging, a forgetting factor for performing time domain averaging, a number of layer one measurements to be averaged in a time window, a parameter for a layer one reference signal received power measurement, a parameter for a layer one signal to interference plus noise ratio measurement, a parameter for a synchronization signal block measurement, or a parameter for a channel state information reference signal measurement.

Selecting the configuration may comprise selecting a plurality of configurations for the serving cell.

The example method may further comprise: transmitting, to the first distributed unit, a layer one measurement report, wherein the layer one measurement report may comprise, at least, a result of the filtering of the plurality of layer one measurements.

The example method may further comprise: transmitting, to a centralized unit, an indication of whether the user equipment supports the two or more filtering configurations.

In accordance with one example embodiment, an apparatus may comprise: circuitry configured to perform: receiving, with a user equipment, two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; circuitry configured to perform: selecting a configuration of the two or more configurations for at least one target cell based, at least partially, on a determination of whether a serving cell and the at least one target cell are controlled with a same distributed unit, wherein the serving cell may be controlled with the first distributed unit; and circuitry configured to perform: filtering of a plurality of layer one measurements associated with the at least one target cell using the selected configuration.

In accordance with one example embodiment, an apparatus may comprise: processing circuitry; memory circuitry including computer program code, the memory circuitry and the computer program code configured to, with the processing circuitry, enable the apparatus to: receive two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; select a configuration of the two or more configurations for at least one target cell based, at least partially, on a determination of whether a serving cell and the at least one target cell are controlled with a same distributed unit, wherein the serving cell may be controlled with the first distributed unit; and perform filtering of a plurality of layer one measurements associated with the at least one target cell using the selected configuration.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: receiving two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; selecting a configuration of the two or more configurations for at least one target cell based, at least partially, on a determination of whether a serving cell and the at least one target cell are controlled with a same distributed unit, wherein the serving cell may be controlled with the first distributed unit; and performing filtering of a plurality of layer one measurements associated with the at least one target cell using the selected configuration.

The two or more filtering configurations may be received via a radio resource control reconfiguration message from a centralized unit.

The two or more filtering configurations may comprise at least one filtering configuration selected by the first distributed unit.

The two or more filtering configurations may respectively comprise at least one filtering configuration parameter, wherein the at least one filtering configuration parameter may comprise at least one of: a parameter for performing time domain averaging, a filter coefficient for performing time domain averaging, a forgetting factor for performing time domain averaging, a number of layer one measurements to be averaged in a time window, a parameter for a layer one reference signal received power measurement, a parameter for a layer one signal to interference plus noise ratio measurement, a parameter for a synchronization signal block measurement, or a parameter for a channel state information reference signal measurement.

The means configured to perform selecting the configuration may comprise means configured to perform: selecting a plurality of configurations for the serving cell.

The means may be further configured to perform: transmitting, to the first distributed unit, a layer one measurement report, wherein the layer one measurement report may comprise, at least, a result of the filtering of the plurality of layer one measurements.

The means may be further configured to perform: transmitting, to a centralized unit, an indication of whether the user equipment supports the two or more filtering configurations.

A processor, memory, and/or example algorithms (which may be encoded as instructions, program, or code) may be provided as example means for providing or causing performance of operation.

In accordance with one example embodiment, a non-transitory computer-readable medium comprising instructions stored thereon which, when executed with at least one processor, cause the at least one processor to: cause receiving of two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; select a configuration of the two or more configurations for at least one target cell based, at least partially, on a determination of whether a serving cell and the at least one target cell are controlled with a same distributed unit, wherein the serving cell may be controlled with the first distributed unit; and perform filtering of a plurality of layer one measurements associated with the at least one target cell using the selected configuration.

In accordance with one example embodiment, a non-transitory computer-readable medium comprising program instructions stored thereon for performing at least the following: causing receiving of two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; selecting a configuration of the two or more configurations for at least one target cell based, at least partially, on a determination of whether a serving cell and the at least one target cell are controlled with a same distributed unit, wherein the serving cell may be controlled with the first distributed unit; and performing filtering of a plurality of layer one measurements associated with the at least one target cell using the selected configuration.

In accordance with another example embodiment, a non-transitory program storage device readable by a machine may be provided, tangibly embodying instructions executable by the machine for performing operations, the operations comprising: causing receiving of two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; selecting a configuration of the two or more configurations for at least one target cell based, at least partially, on a determination of whether a serving cell and the at least one target cell are controlled with a same distributed unit, wherein the serving cell may be controlled with the first distributed unit; and performing filtering of a plurality of layer one measurements associated with the at least one target cell using the selected configuration.

In accordance with another example embodiment, a non-transitory computer-readable medium comprising instructions that, when executed by an apparatus, cause the apparatus to perform at least the following: causing receiving of two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; selecting a configuration of the two or more configurations for at least one target cell based, at least partially, on a determination of whether a serving cell and the at least one target cell are controlled with a same distributed unit, wherein the serving cell may be controlled with the first distributed unit; and performing filtering of a plurality of layer one measurements associated with the at least one target cell using the selected configuration.

A computer implemented system comprising: at least one processor and at least one non-transitory memory storing instructions that, when executed by the at least one processor, cause the system at least to perform: causing receiving of two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; selecting a configuration of the two or more configurations for at least one target cell based, at least partially, on a determination of whether a serving cell and the at least one target cell are controlled with a same distributed unit, wherein the serving cell may be controlled with the first distributed unit; and performing filtering of a plurality of layer one measurements associated with the at least one target cell using the selected configuration.

A computer implemented system comprising: means for causing receiving of two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; means for selecting a configuration of the two or more configurations for at least one target cell based, at least partially, on a determination of whether a serving cell and the at least one target cell are controlled with a same distributed unit, wherein the serving cell may be controlled with the first distributed unit; and means for performing filtering of a plurality of layer one measurements associated with the at least one target cell using the selected configuration.

In accordance with one example embodiment, an apparatus may comprise: at least one processor; and at least one memory storing instructions that, when executed by the at least one processor, cause the apparatus at least to: transmit, to a user equipment, two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and receive, from the user equipment, a radio resource control reconfiguration complete message in response to the two or more filtering configurations.

The two or more filtering configurations may respectively comprise at least one filtering configuration parameter, wherein the at least one filtering configuration parameter may comprise at least one of: a parameter for performing time domain averaging, a filter coefficient for performing time domain averaging, a forgetting factor for performing time domain averaging, a number of layer one measurements to be averaged in a time window, a parameter for a layer one reference signal received power measurement, a parameter for a layer one signal to interference plus noise ratio measurement, a parameter for a synchronization signal block measurement, or a parameter for a channel state information reference signal measurement.

The example apparatus may be further configured to: receive an indication of whether the user equipment supports the two or more filtering configurations.

The example apparatus may be further configured to: receive the two or more filtering configurations from the first distributed unit.

In accordance with one aspect, an example method may be provided comprising: transmitting, with a centralized unit to a user equipment, two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and receiving, from the user equipment, a radio resource control reconfiguration complete message in response to the two or more filtering configurations.

The two or more filtering configurations may respectively comprise at least one filtering configuration parameter, wherein the at least one filtering configuration parameter may comprise at least one of: a parameter for performing time domain averaging, a filter coefficient for performing time domain averaging, a forgetting factor for performing time domain averaging, a number of layer one measurements to be averaged in a time window, a parameter for a layer one reference signal received power measurement, a parameter for a layer one signal to interference plus noise ratio measurement, a parameter for a synchronization signal block measurement, or a parameter for a channel state information reference signal measurement.

The example method may further comprise: receiving an indication of whether the user equipment supports the two or more filtering configurations.

The example method may further comprise: receiving the two or more filtering configurations from the first distributed unit.

In accordance with one example embodiment, an apparatus may comprise: circuitry configured to perform: transmitting, with a centralized unit to a user equipment, two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and circuitry configured to perform: receiving, from the user equipment, a radio resource control reconfiguration complete message in response to the two or more filtering configurations.

In accordance with one example embodiment, an apparatus may comprise: processing circuitry; memory circuitry including computer program code, the memory circuitry and the computer program code configured to, with the processing circuitry, enable the apparatus to: transmit, to a user equipment, two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and receive, from the user equipment, a radio resource control reconfiguration complete message in response to the two or more filtering configurations.

In accordance with one example embodiment, an apparatus may comprise means for performing: transmitting, to a user equipment, two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and receiving, from the user equipment, a radio resource control reconfiguration complete message in response to the two or more filtering configurations.

The two or more filtering configurations may respectively comprise at least one filtering configuration parameter, wherein the at least one filtering configuration parameter may comprise at least one of: a parameter for performing time domain averaging, a filter coefficient for performing time domain averaging, a forgetting factor for performing time domain averaging, a number of layer one measurements to be averaged in a time window, a parameter for a layer one reference signal received power measurement, a parameter for a layer one signal to interference plus noise ratio measurement, a parameter for a synchronization signal block measurement, or a parameter for a channel state information reference signal measurement.

The means may be further configured to perform: receiving an indication of whether the user equipment supports the two or more filtering configurations.

The means may be further configured to perform: receiving the two or more filtering configurations from the first distributed unit.

In accordance with one example embodiment, a non-transitory computer-readable medium comprising instructions stored thereon which, when executed with at least one processor, cause the at least one processor to: cause transmitting, to a user equipment, of two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and cause receiving, from the user equipment, of a radio resource control reconfiguration complete message in response to the two or more filtering configurations.

In accordance with one example embodiment, a non-transitory computer-readable medium comprising program instructions stored thereon for performing at least the following: causing transmitting, to a user equipment, of two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and causing receiving, from the user equipment, of a radio resource control reconfiguration complete message in response to the two or more filtering configurations.

In accordance with another example embodiment, a non-transitory program storage device readable by a machine may be provided, tangibly embodying instructions executable by the machine for performing operations, the operations comprising: causing transmitting, to a user equipment, of two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and causing receiving, from the user equipment, of a radio resource control reconfiguration complete message in response to the two or more filtering configurations.

In accordance with another example embodiment, a non-transitory computer-readable medium comprising instructions that, when executed by an apparatus, cause the apparatus to perform at least the following: causing transmitting, to a user equipment, of two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and causing receiving, from the user equipment, of a radio resource control reconfiguration complete message in response to the two or more filtering configurations.

A computer implemented system comprising: at least one processor and at least one non-transitory memory storing instructions that, when executed by the at least one processor, cause the system at least to perform: causing transmitting, to a user equipment, of two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and causing receiving, from the user equipment, of a radio resource control reconfiguration complete message in response to the two or more filtering configurations.

A computer implemented system comprising: means for causing transmitting, to a user equipment, of two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and means for causing receiving, from the user equipment, of a radio resource control reconfiguration complete message in response to the two or more filtering configurations.

In accordance with one example embodiment, an apparatus may comprise: at least one processor; and at least one memory storing instructions that, when executed by the at least one processor, cause the apparatus at least to: receive two or more filtering configurations, wherein a first configuration of the two or more filtering configurations may be associated with at least one first target cell associated with the apparatus, wherein a second configuration of the two or more filtering configurations may be associated with at least one second target cell associated with at least one second distributed unit, wherein the at least one second distributed unit may be different from the apparatus; select a configuration of the two or more configurations for at least one target cell based, at least partially, on a determination of whether a serving cell and the at least one target cell are controlled with a same distributed unit, wherein the serving cell may be controlled with the apparatus; receive, from a user equipment, a layer one measurement report, wherein the layer one measurement report may comprise a plurality of layer one measurements associated with the at least one target cell; and perform filtering of the plurality of layer one measurements using the selected configuration.

The two or more filtering configurations may be received from one of: a centralized unit, or an operations, administration and maintenance function.

The two or more filtering configurations may be received during setup of an interface between the apparatus and a centralized unit.

The two or more filtering configurations respectively may comprise at least one filtering configuration parameter, wherein the at least one filtering configuration parameter may comprise at least one of: a parameter for performing time domain averaging, a filter coefficient for performing time domain averaging, a forgetting factor for performing time domain averaging, a number of layer one measurements to be averaged in a time window, a parameter for a layer one reference signal received power measurement, a parameter for a layer one signal to interference plus noise ratio measurement, a parameter for a synchronization signal block measurement, or a parameter for a channel state information reference signal measurement.

Selecting the configuration may comprise the example apparatus being further configured to: select a plurality of configurations for the serving cell.

The example apparatus may be further configured to: transmit, to the user equipment, a handover command based on a result of the filtering of the plurality of layer one measurements.

The example apparatus may be further configured to: transmit, to a centralized unit, an indication of whether the apparatus supports the two or more filtering configurations.

In accordance with one aspect, an example method may be provided comprising: receiving, with a distributed unit, two or more filtering configurations, wherein a first configuration of the two or more filtering configurations may be associated with at least one first target cell associated with the distributed unit, wherein a second configuration of the two or more filtering configurations may be associated with at least one second target cell associated with at least one second distributed unit, wherein the at least one second distributed unit may be different from the distributed unit; selecting a configuration of the two or more configurations for at least one target cell based, at least partially, on a determination of whether a serving cell and the at least one target cell are controlled with a same distributed unit, wherein the serving cell may be controlled with the distributed unit; receiving, from a user equipment, a layer one measurement report, wherein the layer one measurement report may comprise a plurality of layer one measurements associated with the at least one target cell; and performing filtering of the plurality of layer one measurements using the selected configuration.

The two or more filtering configurations may be received from one of: a centralized unit, or an operations, administration and maintenance function.

The two or more filtering configurations may be received during setup of an interface between the distributed unit and a centralized unit.

The two or more filtering configurations may respectively comprise at least one filtering configuration parameter, wherein the at least one filtering configuration parameter may comprise at least one of: a parameter for performing time domain averaging, a filter coefficient for performing time domain averaging, a forgetting factor for performing time domain averaging, a number of layer one measurements to be averaged in a time window, a parameter for a layer one reference signal received power measurement, a parameter for a layer one signal to interference plus noise ratio measurement, a parameter for a synchronization signal block measurement, or a parameter for a channel state information reference signal measurement.

Selecting the configuration may comprise selecting a plurality of configurations for the serving cell.

The example method may further comprise: transmitting, to the user equipment, a handover command based on a result of the filtering of the plurality of layer one measurements.

The example method may further comprise: transmitting, to a centralized unit, an indication of whether the distributed unit supports the two or more filtering configurations.

In accordance with one example embodiment, an apparatus may comprise: circuitry configured to perform: receiving, with a distributed unit, two or more filtering configurations, wherein a first configuration of the two or more filtering configurations may be associated with at least one first target cell associated with the distributed unit, wherein a second configuration of the two or more filtering configurations may be associated with at least one second target cell associated with at least one second distributed unit, wherein the at least one second distributed unit may be different from the distributed unit; circuitry configured to perform: selecting a configuration of the two or more configurations for at least one target cell based, at least partially, on a determination of whether a serving cell and the at least one target cell are controlled with a same distributed unit, wherein the serving cell may be controlled with the distributed unit; circuitry configured to perform: receiving, from a user equipment, a layer one measurement report, wherein the layer one measurement report may comprise a plurality of layer one measurements associated with the at least one target cell; and circuitry configured to perform: filtering of the plurality of layer one measurements using the selected configuration.

In accordance with one example embodiment, an apparatus may comprise: processing circuitry; memory circuitry including computer program code, the memory circuitry and the computer program code configured to, with the processing circuitry, enable the apparatus to: receive two or more filtering configurations, wherein a first configuration of the two or more filtering configurations may be associated with at least one first target cell associated with the apparatus, wherein a second configuration of the two or more filtering configurations may be associated with at least one second target cell associated with at least one second distributed unit, wherein the at least one second distributed unit may be different from the apparatus; select a configuration of the two or more configurations for at least one target cell based, at least partially, on a determination of whether a serving cell and the at least one target cell are controlled with a same distributed unit, wherein the serving cell may be controlled with the apparatus; receive, from a user equipment, a layer one measurement report, wherein the layer one measurement report may comprise a plurality of layer one measurements associated with the at least one target cell; and perform filtering of the plurality of layer one measurements using the selected configuration.

In accordance with one example embodiment, an apparatus may comprise means for performing: receiving two or more filtering configurations, wherein a first configuration of the two or more filtering configurations may be associated with at least one first target cell associated with the apparatus, wherein a second configuration of the two or more filtering configurations may be associated with at least one second target cell associated with at least one second distributed unit, wherein the at least one second distributed unit may be different from the apparatus; selecting a configuration of the two or more configurations for at least one target cell based, at least partially, on a determination of whether a serving cell and the at least one target cell are controlled with a same distributed unit, wherein the serving cell may be controlled with the apparatus; receiving, from a user equipment, a layer one measurement report, wherein the layer one measurement report may comprise a plurality of layer one measurements associated with the at least one target cell; and performing filtering of the plurality of layer one measurements using the selected configuration.

The two or more filtering configurations may be received from one of: a centralized unit, or an operations, administration and maintenance function.

The two or more filtering configurations may be received during setup of an interface between the distributed unit and a centralized unit.

The two or more filtering configurations may respectively comprise at least one filtering configuration parameter, wherein the at least one filtering configuration parameter may comprise at least one of: a parameter for performing time domain averaging, a filter coefficient for performing time domain averaging, a forgetting factor for performing time domain averaging, a number of layer one measurements to be averaged in a time window, a parameter for a layer one reference signal received power measurement, a parameter for a layer one signal to interference plus noise ratio measurement, a parameter for a synchronization signal block measurement, or a parameter for a channel state information reference signal measurement.

The means configured to perform selecting the configuration may comprise means configured to perform selecting a plurality of configurations for the serving cell.

The means may be further configured to perform: transmitting, to the user equipment, a handover command based on a result of the filtering of the plurality of layer one measurements.

The means may be further configured to perform: transmitting, to a centralized unit, an indication of whether the distributed unit supports the two or more filtering configurations.

In accordance with one example embodiment, a non-transitory computer-readable medium comprising instructions stored thereon which, when executed with at least one processor, cause the at least one processor to: cause receiving, with a distributed unit, of two or more filtering configurations, wherein a first configuration of the two or more filtering configurations may be associated with at least one first target cell associated with the distributed unit, wherein a second configuration of the two or more filtering configurations may be associated with at least one second target cell associated with at least one second distributed unit, wherein the at least one second distributed unit may be different from the distributed unit; selecting a configuration of the two or more configurations for at least one target cell based, at least partially, on a determination of whether a serving cell and the at least one target cell are controlled with a same distributed unit, wherein the serving cell may be controlled with the distributed unit; cause receiving, from a user equipment, of a layer one measurement report, wherein the layer one measurement report may comprise a plurality of layer one measurements associated with the at least one target cell; and perform filtering of the plurality of layer one measurements using the selected configuration.

In accordance with one example embodiment, a non-transitory computer-readable medium comprising program instructions stored thereon for performing at least the following: causing receiving, with a distributed unit, of two or more filtering configurations, wherein a first configuration of the two or more filtering configurations may be associated with at least one first target cell associated with the distributed unit, wherein a second configuration of the two or more filtering configurations may be associated with at least one second target cell associated with at least one second distributed unit, wherein the at least one second distributed unit may be different from the distributed unit; selecting a configuration of the two or more configurations for at least one target cell based, at least partially, on a determination of whether a serving cell and the at least one target cell are controlled with a same distributed unit, wherein the serving cell may be controlled with the distributed unit; causing receiving, from a user equipment, of a layer one measurement report, wherein the layer one measurement report may comprise a plurality of layer one measurements associated with the at least one target cell; and performing filtering of the plurality of layer one measurements using the selected configuration.

In accordance with another example embodiment, a non-transitory program storage device readable by a machine may be provided, tangibly embodying instructions executable by the machine for performing operations, the operations comprising: causing receiving, with a distributed unit, of two or more filtering configurations, wherein a first configuration of the two or more filtering configurations may be associated with at least one first target cell associated with the distributed unit, wherein a second configuration of the two or more filtering configurations may be associated with at least one second target cell associated with at least one second distributed unit, wherein the at least one second distributed unit may be different from the distributed unit; selecting a configuration of the two or more configurations for at least one target cell based, at least partially, on a determination of whether a serving cell and the at least one target cell are controlled with a same distributed unit, wherein the serving cell may be controlled with the distributed unit; causing receiving, from a user equipment, of a layer one measurement report, wherein the layer one measurement report may comprise a plurality of layer one measurements associated with the at least one target cell; and performing filtering of the plurality of layer one measurements using the selected configuration.

In accordance with another example embodiment, a non-transitory computer-readable medium comprising instructions that, when executed by an apparatus, cause the apparatus to perform at least the following: causing receiving, with a distributed unit, of two or more filtering configurations, wherein a first configuration of the two or more filtering configurations may be associated with at least one first target cell associated with the distributed unit, wherein a second configuration of the two or more filtering configurations may be associated with at least one second target cell associated with at least one second distributed unit, wherein the at least one second distributed unit may be different from the distributed unit; selecting a configuration of the two or more configurations for at least one target cell based, at least partially, on a determination of whether a serving cell and the at least one target cell are controlled with a same distributed unit, wherein the serving cell may be controlled with the distributed unit; causing receiving, from a user equipment, of a layer one measurement report, wherein the layer one measurement report may comprise a plurality of layer one measurements associated with the at least one target cell; and performing filtering of the plurality of layer one measurements using the selected configuration.

A computer implemented system comprising: at least one processor and at least one non-transitory memory storing instructions that, when executed by the at least one processor, cause the system at least to perform: causing receiving, with a distributed unit, of two or more filtering configurations, wherein a first configuration of the two or more filtering configurations may be associated with at least one first target cell associated with the distributed unit, wherein a second configuration of the two or more filtering configurations may be associated with at least one second target cell associated with at least one second distributed unit, wherein the at least one second distributed unit may be different from the distributed unit; selecting a configuration of the two or more configurations for at least one target cell based, at least partially, on a determination of whether a serving cell and the at least one target cell are controlled with a same distributed unit, wherein the serving cell may be controlled with the distributed unit; causing receiving, from a user equipment, of a layer one measurement report, wherein the layer one measurement report may comprise a plurality of layer one measurements associated with the at least one target cell; and performing filtering of the plurality of layer one measurements using the selected configuration.

A computer implemented system comprising: means for causing receiving, with a distributed unit, of two or more filtering configurations, wherein a first configuration of the two or more filtering configurations may be associated with at least one first target cell associated with the distributed unit, wherein a second configuration of the two or more filtering configurations may be associated with at least one second target cell associated with at least one second distributed unit, wherein the at least one second distributed unit may be different from the distributed unit; means for selecting a configuration of the two or more configurations for at least one target cell based, at least partially, on a determination of whether a serving cell and the at least one target cell are controlled with a same distributed unit, wherein the serving cell may be controlled with the distributed unit; causing receiving, from a user equipment, of a layer one measurement report, wherein the layer one measurement report may comprise a plurality of layer one measurements associated with the at least one target cell; and means for performing filtering of the plurality of layer one measurements using the selected configuration.

In accordance with one example embodiment, an apparatus may comprise: at least one processor; and at least one memory storing instructions that, when executed by the at least one processor, cause the apparatus at least to: determine two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and transmit, to the first distributed unit, the two or more filtering configurations.

The example apparatus may be further configured to: transmit, to a user equipment of a serving cell controlled with the first distributed unit, a radio resource control reconfiguration message; and receive, from the user equipment, a radio resource control reconfiguration complete message.

The two or more filtering configurations may respectively comprise at least one filtering configuration parameter, wherein the at least one filtering configuration parameter may comprise at least one of: a parameter for performing time domain averaging, a filter coefficient for performing time domain averaging, a forgetting factor for performing time domain averaging, a number of layer one measurements to be averaged in a time window, a parameter for a layer one reference signal received power measurement, a parameter for a layer one signal to interference plus noise ratio measurement, a parameter for a synchronization signal block measurement, or a parameter for a channel state information reference signal measurement.

The example apparatus may be further configured to: receive an indication of whether the first distributed unit supports the two or more filtering configurations.

In accordance with one aspect, an example method may be provided comprising: determining, with a centralized unit, two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and transmitting, to the first distributed unit, the two or more filtering configurations.

The example method may further comprise: transmitting, to a user equipment of a serving cell controlled with the first distributed unit, a radio resource control reconfiguration message; and receiving, from the user equipment, a radio resource control reconfiguration complete message.

The two or more filtering configurations may respectively comprise at least one filtering configuration parameter, wherein the at least one filtering configuration parameter may comprise at least one of: a parameter for performing time domain averaging, a filter coefficient for performing time domain averaging, a forgetting factor for performing time domain averaging, a number of layer one measurements to be averaged in a time window, a parameter for a layer one reference signal received power measurement, a parameter for a layer one signal to interference plus noise ratio measurement, a parameter for a synchronization signal block measurement, or a parameter for a channel state information reference signal measurement.

The example method may further comprise: receiving an indication of whether the first distributed unit supports the two or more filtering configurations.

In accordance with one example embodiment, an apparatus may comprise: circuitry configured to perform: determining, with a centralized unit, two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and circuitry configured to perform: transmitting, to the first distributed unit, the two or more filtering configurations.

In accordance with one example embodiment, an apparatus may comprise: processing circuitry; memory circuitry including computer program code, the memory circuitry and the computer program code configured to, with the processing circuitry, enable the apparatus to: determine two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and transmit, to the first distributed unit, the two or more filtering configurations.

In accordance with one example embodiment, an apparatus may comprise means for performing: determining two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and transmitting, to the first distributed unit, the two or more filtering configurations.

The means may be further configured to perform: transmitting, to a user equipment of a serving cell controlled with the first distributed unit, a radio resource control reconfiguration message; and receiving, from the user equipment, a radio resource control reconfiguration complete message.

The two or more filtering configurations may respectively comprise at least one filtering configuration parameter, wherein the at least one filtering configuration parameter may comprise at least one of: a parameter for performing time domain averaging, a filter coefficient for performing time domain averaging, a forgetting factor for performing time domain averaging, a number of layer one measurements to be averaged in a time window, a parameter for a layer one reference signal received power measurement, a parameter for a layer one signal to interference plus noise ratio measurement, a parameter for a synchronization signal block measurement, or a parameter for a channel state information reference signal measurement.

The means may be further configured to perform: receiving an indication of whether the first distributed unit supports the two or more filtering configurations.

In accordance with one example embodiment, a non-transitory computer-readable medium comprising instructions stored thereon which, when executed with at least one processor, cause the at least one processor to: determine two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and cause transmitting, to the first distributed unit, of the two or more filtering configurations.

In accordance with one example embodiment, a non-transitory computer-readable medium comprising program instructions stored thereon for performing at least the following: determining two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and causing transmitting, to the first distributed unit, of the two or more filtering configurations.

In accordance with another example embodiment, a non-transitory program storage device readable by a machine may be provided, tangibly embodying instructions executable by the machine for performing operations, the operations comprising: determining two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and causing transmitting, to the first distributed unit, of the two or more filtering configurations.

In accordance with another example embodiment, a non-transitory computer-readable medium comprising instructions that, when executed by an apparatus, cause the apparatus to perform at least the following: determining two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and causing transmitting, to the first distributed unit, of the two or more filtering configurations.

A computer implemented system comprising: at least one processor and at least one non-transitory memory storing instructions that, when executed by the at least one processor, cause the system at least to perform: determining two or more filtering configurations, wherein a first configuration of the two or more filtering configurations may be associated with at least one first target cell associated with a first distributed unit, wherein a second configuration of the two or more, filtering configurations may be associated with at least one second target cell associated with at least one second distributed unit, wherein the first distributed unit may be different from the at least one second distributed unit; and causing transmitting, to the first distributed unit, of the two or more filtering configurations.

A computer implemented system comprising: means for determining two or more filtering configurations, wherein a first configuration of the two or more filtering configurations may be associated with at least one first target cell associated with a first distributed unit, wherein a second configuration of the two or more filtering configurations may be associated with at least one second target cell associated with at least one second distributed unit, wherein the first distributed unit may be different from the at least one second distributed unit; and means for causing transmitting, to the first distributed unit, of the two or more filtering configurations.

In accordance with one example embodiment, an apparatus may comprise: at least one processor; and at least one memory storing instructions that, when executed by the at least one processor, cause the apparatus at least to: cause transmission, to a user equipment, of at least one filtering configuration, wherein the user equipment may be served via a serving cell of a first distributed unit; and transmit, to the first distributed unit, two or more filtering configurations, wherein a first configuration of the two or more filtering configurations may be associated with at least one first target cell associated with the first distributed unit, wherein a second configuration of the two or more filtering configurations may be associated with at least one second target cell associated with at least one second distributed unit, wherein the at least one second distributed unit may be different from the first distributed unit.

The first distributed unit and the at least one second distributed unit may be associated with the apparatus.

Causing transmission of the at least one filtering configuration to the user equipment may comprise the example apparatus being configured to: transmit the at least one filtering configuration to the user equipment via a radio resource control reconfiguration message; or transmit the at least one filtering configuration to the first distributed unit for forwarding to the user equipment.

The at least one filtering configuration may be configured to cause the user equipment to filter layer one beam measurements of at least one target cell to generate at least one filtered average measurement result, wherein the two or more filtering configurations may be configured to cause the first distributed unit to filter the at least one filtered average measurement result.

The two or more filtering configurations may respectively comprise at least one filtering configuration parameter, wherein the at least one filtering configuration parameter may comprise at least one of: a parameter for performing time domain averaging, a filter coefficient for performing time domain averaging, a forgetting factor for performing time domain averaging, a number of layer one measurements to be averaged in a time window, a parameter for a layer one reference signal received power measurement, a parameter for a layer one signal to interference plus noise ratio measurement, a parameter for a synchronization signal block measurement, or a parameter for a channel state information reference signal measurement.

In accordance with one aspect, an example method may be provided comprising: causing transmission, with a centralized unit to a user equipment, of at least one filtering configuration, wherein the user equipment may be served via a serving cell of a first distributed unit; and transmitting, to the first distributed unit, two or more filtering configurations, wherein a first configuration of the two or more filtering configurations may be associated with at least one first target cell associated with the first distributed unit, wherein a second configuration of the two or more filtering configurations may be associated with at least one second target cell associated with at least one second distributed unit, wherein the at least one second distributed unit may be different from the first distributed unit.

The first distributed unit and the at least one second distributed unit may be associated with the centralized unit.

Causing transmission of the at least one filtering configuration to the user equipment may comprise: transmitting the at least one filtering configuration to the user equipment via a radio resource control reconfiguration message; or transmitting the at least one filtering configuration to the first distributed unit for forwarding to the user equipment.

The at least one filtering configuration may be configured to cause the user equipment to filter layer one beam measurements of at least one target cell to generate at least one filtered average measurement result, wherein the two or more filtering configurations may be configured to cause the first distributed unit to filter the at least one filtered average measurement result.

The two or more filtering configurations may respectively comprise at least one filtering configuration parameter, wherein the at least one filtering configuration parameter may comprise at least one of: a parameter for performing time domain averaging, a filter coefficient for performing time domain averaging, a forgetting factor for performing time domain averaging, a number of layer one measurements to be averaged in a time window, a parameter for a layer one reference signal received power measurement, a parameter for a layer one signal to interference plus noise ratio measurement, a parameter for a synchronization signal block measurement, or a parameter for a channel state information reference signal measurement.

In accordance with one example embodiment, an apparatus may comprise: circuitry configured to perform: causing transmission, with a centralized unit to a user equipment, of at least one filtering configuration, wherein the user equipment may be served via a serving cell of a first distributed unit; and circuitry configured to perform: transmitting, to the first distributed unit, two or more filtering configurations, wherein a first configuration of the two or more filtering configurations may be associated with at least one first target cell associated with the first distributed unit, wherein a second configuration of the two or more filtering configurations may be associated with at least one second target cell associated with at least one second distributed unit, wherein the at least one second distributed unit may be different from the first distributed unit.

In accordance with one example embodiment, an apparatus may comprise: processing circuitry; memory circuitry including computer program code, the memory circuitry and the computer program code configured to, with the processing circuitry, enable the apparatus to: cause transmission, to a user equipment, of at least one filtering configuration, wherein the user equipment may be served via a serving cell of a first distributed unit; and transmit, to the first distributed unit, two or more filtering configurations, wherein a first configuration of the two or more filtering configurations may be associated with at least one first target cell associated with the first distributed unit, wherein a second configuration of the two or more filtering configurations may be associated with at least one second target cell associated with at least one second distributed unit, wherein the at least one second distributed unit may be different from the first distributed unit.

In accordance with one example embodiment, an apparatus may comprise means for performing: causing transmission, to a user equipment, of at least one filtering configuration, wherein the user equipment may be served via a serving cell of a first distributed unit; and transmitting, to the first distributed unit, two or more filtering configurations, wherein a first configuration of the two or more filtering configurations may be associated with at least one first target cell associated with the first distributed unit, wherein a second configuration of the two or more filtering configurations may be associated with at least one second target cell associated with at least one second distributed unit, wherein the at least one second distributed unit may be different from the first distributed unit.

The first distributed unit and the at least one second distributed unit may be associated with the centralized unit.

The means configured to perform causing transmission of the at least one filtering configuration to the user equipment may comprise means configured to perform: transmitting the at least one filtering configuration to the user equipment via a radio resource control reconfiguration message; or transmitting the at least one filtering configuration to the first distributed unit for forwarding to the user equipment.

The at least one filtering configuration may be configured to cause the user equipment to filter layer one beam measurements of at least one target cell to generate at least one filtered average measurement result, wherein the two or more filtering configurations may be configured to cause the first distributed unit to filter the at least one filtered average measurement result.

The two or more filtering configurations may respectively comprise at least one filtering configuration parameter, wherein the at least one filtering configuration parameter may comprise at least one of: a parameter for performing time domain averaging, a filter coefficient for performing time domain averaging, a forgetting factor for performing time domain averaging, a number of layer one measurements to be averaged in a time window, a parameter for a layer one reference signal received power measurement, a parameter for a layer one signal to interference plus noise ratio measurement, a parameter for a synchronization signal block measurement, or a parameter for a channel state information reference signal measurement.

In accordance with one example embodiment, a non-transitory computer-readable medium comprising instructions stored thereon which, when executed with at least one processor, cause the at least one processor to: cause transmission, to a user equipment, of at least one filtering configuration, wherein the user equipment may be served via a serving cell of a first distributed unit; and cause transmitting, to the first distributed unit, of two or more filtering configurations, wherein a first configuration of the two or more filtering configurations may be associated with at least one first target cell associated with the first distributed unit, wherein a second configuration of the two or more filtering configurations may be associated with at least one second target cell associated with at least one second distributed unit, wherein the at least one second distributed unit may be different from the first distributed unit.

In accordance with one example embodiment, a non-transitory computer-readable medium comprising program instructions stored thereon for performing at least the following: causing transmission, to a user equipment, of at least one filtering configuration, wherein the user equipment may be served via a serving cell of a first distributed unit; and causing transmitting, to the first distributed unit, of two or more filtering configurations, wherein a first configuration of the two or more filtering configurations may be associated with at least one first target cell associated with the first distributed unit, wherein a second configuration of the two or more filtering configurations may be associated with at least one second target cell associated with at least one second distributed unit, wherein the at least one second distributed unit may be different from the first distributed unit.

In accordance with another example embodiment, a non-transitory program storage device readable by a machine may be provided, tangibly embodying instructions executable by the machine for performing operations, the operations comprising: causing transmission, to a user equipment, of at least one filtering configuration, wherein the user equipment may be served via a serving cell of a first distributed unit; and causing transmitting, to the first distributed unit, of two or more filtering configurations, wherein a first configuration of the two or more filtering configurations may be associated with at least one first target cell associated with the first distributed unit, wherein a second configuration of the two or more filtering configurations may be associated with at least one second target cell associated with at least one second distributed unit, wherein the at least one second distributed unit may be different from the first distributed unit.

In accordance with another example embodiment, a non-transitory computer-readable medium comprising instructions that, when executed by an apparatus, cause the apparatus to perform at least the following: causing transmission, to a user equipment, of at least one filtering configuration, wherein the user equipment may be served via a serving cell of a first distributed unit; and causing transmitting, to the first distributed unit, of two or more filtering configurations, wherein a first configuration of the two or more filtering configurations may be associated with at least one first target cell associated with the first distributed unit, wherein a second configuration of the two or more filtering configurations may be associated with at least one second target cell associated with at least one second distributed unit, wherein the at least one second distributed unit may be different from the first distributed unit.

A computer implemented system comprising: at least one processor and at least one non-transitory memory storing instructions that, when executed by the at least one processor, cause the system at least to perform: causing transmission, to a user equipment, of at least one filtering configuration, wherein the user equipment may be served via a serving cell of a first distributed unit; and causing transmitting, to the first distributed unit, of two or more filtering configurations, wherein a first configuration of the two or more filtering configurations may be associated with at least one first target cell associated with the first distributed unit, wherein a second configuration of the two or more filtering configurations may be associated with at least one second target cell associated with at least one second distributed unit, wherein the at least one second distributed unit may be different from the first distributed unit.

A computer implemented system comprising: means for causing transmission, to a user equipment, of at least one filtering configuration, wherein the user equipment may be served via a serving cell of a first distributed unit; and means for causing transmitting, to the first distributed unit, of two or more filtering configurations, wherein a first configuration of the two or more filtering configurations may be associated with at least one first target cell associated with the first distributed unit, wherein a second configuration of the two or more filtering configurations may be associated with at least one second target cell associated with at least one second distributed unit, wherein the at least one second distributed unit may be different from the first distributed unit.

The term "non-transitory," as used herein, is a limitation of the medium itself (i.e. tangible, not a signal) as opposed to a limitation on data storage persistency (e.g., RAM vs. ROM).

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:
    at least one processor; and
    at least one non-transitory memory storing instructions that, when executed by the at least one processor, cause the apparatus at least to:
        receive two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit, and wherein the first distributed unit and the at least one second distributed unit are logical nodes of a radio access network;
        select a configuration of the two or more filtering configurations for at least one target cell based, at least partially, on a determination of whether a serving cell and the at least one target cell are controlled with a same distributed unit, wherein the serving cell is controlled with the first distributed unit; and
        perform filtering of a plurality of layer one measurements associated with the at least one target cell using the selected configuration.

2. The apparatus of claim 1, wherein the two or more filtering configurations are received via a radio resource control reconfiguration message from a centralized unit, wherein the centralized unit is a logical node of the radio access network, wherein the centralized unit is configured to control operation of the first distributed unit and the at least one second distributed unit.

3. The apparatus of claim 2, wherein the two or more filtering configurations comprise at least one filtering configuration selected by the first distributed unit.

4. The apparatus of claim 1, wherein the two or more filtering configurations respectively comprise at least one filtering configuration parameter, wherein the at least one filtering configuration parameter comprises at least one of:
    a parameter for performing time domain averaging,
    a filter coefficient for performing the time domain averaging,
    a forgetting factor for performing the time domain averaging,
    a number of layer one measurements to be averaged in a time window,
    a parameter for a layer one reference signal received power measurement,
    a parameter for a layer one signal to interference plus noise ratio measurement,
    a parameter for a synchronization signal block measurement, or
    a parameter for a channel state information reference signal measurement.

5. The apparatus of claim 1, wherein the at least one memory, storing the instructions, when executed by the at least one processor, causes the apparatus to:
    transmit, to the first distributed unit, a layer one measurement report, wherein the layer one measurement report comprises, at least, a result of the filtering of the plurality of layer one measurements.

6. The apparatus of claim 1, wherein the at least one memory, storing the instructions, when executed by the at least one processor, causes the apparatus to:
transmit, to a centralized unit, an indication of whether the apparatus supports the two or more filtering configurations, wherein the centralized unit is a logical node of the radio access network, wherein the centralized unit is configured to control operation of the first distributed unit and the at least one second distributed unit.

7. A method comprising:
receiving, with a user equipment, two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit, and wherein the first distributed unit and the at least one second distributed unit are logical nodes of a radio access network;
selecting a configuration of the two or more filtering configurations for at least one target cell based, at least partially, on a determination of whether a serving cell and the at least one target cell are controlled with a same distributed unit, wherein the serving cell is controlled with the first distributed unit; and
performing filtering of a plurality of layer one measurements associated with the at least one target cell using the selected configuration.

8. The method of claim 7, wherein the two or more filtering configurations are received via a radio resource control reconfiguration message from a centralized unit, wherein the centralized unit is a logical node of the radio access network, wherein the centralized unit is configured to control operation of the first distributed unit and the at least one second distributed unit.

9. The method of claim 8, wherein the two or more filtering configurations comprise at least one filtering configuration selected by the first distributed unit.

10. The method of claim 7, wherein the two or more filtering configurations respectively comprise at least one filtering configuration parameter, wherein the at least one filtering configuration parameter comprises at least one of:
a parameter for performing time domain averaging,
a filter coefficient for performing the time domain averaging,
a forgetting factor for performing the time domain averaging,
a number of layer one measurements to be averaged in a time window,
a parameter for a layer one reference signal received power measurement,
a parameter for a layer one signal to interference plus noise ratio measurement,
a parameter for a synchronization signal block measurement, or
a parameter for a channel state information reference signal measurement.

11. The method of claim 7, further comprising:
transmitting, to the first distributed unit, a layer one measurement report, wherein the layer one measurement report comprises, at least, a result of the filtering of the plurality of layer one measurements.

12. The method of claim 7, further comprising:
transmitting, to a centralized unit, an indication of whether the user equipment supports the two or more filtering configurations, wherein the centralized unit is a logical node of the radio access network, wherein the centralized unit is configured to control operation of the first distributed unit and the at least one second distributed unit.

13. An apparatus comprising:
at least one processor; and
at least one non-transitory memory storing instructions that, when executed by the at least one processor, cause the apparatus at least to:
transmit, to a user equipment, two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit, and wherein the first distributed unit and the at least one second distributed unit are logical nodes of a radio access network; and
receive, from the user equipment, a radio resource control reconfiguration complete message in response to the two or more filtering configurations.

14. The apparatus of claim 13, wherein the two or more filtering configurations respectively comprise at least one filtering configuration parameter, wherein the at least one filtering configuration parameter comprises at least one of:
a parameter for performing time domain averaging,
a filter coefficient for performing the time domain averaging,
a forgetting factor for performing the time domain averaging,
a number of layer one measurements to be averaged in a time window,
a parameter for a layer one reference signal received power measurement,
a parameter for a layer one signal to interference plus noise ratio measurement,
a parameter for a synchronization signal block measurement, or
a parameter for a channel state information reference signal measurement.

15. The apparatus of claim 13, wherein the at least one memory, storing the instructions, when executed by the at least one processor, causes the apparatus to:
receive an indication of whether the user equipment supports the two or more filtering configurations.

16. The apparatus of claim 13, wherein the at least one memory, storing the instructions, when executed by the at least one processor, causes the apparatus to:
receive the two or more filtering configurations from the first distributed unit.

17. A method comprising:
transmitting, with a centralized unit to a user equipment, two or more filtering configurations, wherein a first configuration of the two or more filtering configurations is associated with at least one first target cell associated with a first distributed unit, wherein a second configuration of the two or more filtering configurations is associated with at least one second target cell associated with at least one second distributed unit, wherein the first distributed unit is different from the at least one second distributed unit, wherein the centralized unit, the first distributed unit and the at least one second distributed unit are logical nodes of a radio access network, wherein the centralized unit is configured to control operation of the first distributed unit and the at least one second distributed unit; and receiving, from the user equipment, a radio resource control reconfiguration complete message in response to the two or more filtering configurations.

18. The method of claim 17, wherein the two or more filtering configurations respectively comprise at least one filtering configuration parameter, wherein the at least one filtering configuration parameter comprises at least one of:
   a parameter for performing time domain averaging,
   a filter coefficient for performing the time domain averaging,
   a forgetting factor for performing the time domain averaging,
   a number of layer one measurements to be averaged in a time window,
   a parameter for a layer one reference signal received power measurement,
   a parameter for a layer one signal to interference plus noise ratio measurement,
   a parameter for a synchronization signal block measurement, or
   a parameter for a channel state information reference signal measurement.

19. The method of claim 17, further comprising:
receiving an indication of whether the user equipment supports the two or more filtering configurations.

20. The method of claim 17, further comprising:
receiving the two or c more filtering configurations from the first distributed unit.

* * * * *